(12) United States Patent
Ingale et al.

(10) Patent No.: US 10,674,356 B2
(45) Date of Patent: Jun. 2, 2020

(54) DUAL CONNECTIVITY MODE OF OPERATION OF A USER EQUIPMENT IN A WIRELESS COMMUNICATION NETWORK

(71) Applicant: Samsung Electronics Co., Ltd., Suwon-si, Gyeonggi-do (KR)

(72) Inventors: Mangesh Abhimanyu Ingale, Bangalore (IN); Himke Van Der Velde, Middlesex (GB); Rajavelsamy Rajadurai, Bangalore (IN); Woo-Seong Kim, Gwacheon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/532,130

(22) Filed: Aug. 5, 2019

(65) Prior Publication Data

US 2019/0364423 A1    Nov. 28, 2019

Related U.S. Application Data

(63) Continuation of application No. 16/111,730, filed on Aug. 24, 2018, now Pat. No. 10,375,571, which is a (Continued)

(30) Foreign Application Priority Data

Jan. 17, 2014   (IN) .............................. 202/CHE/2014
Mar. 24, 2014  (IN) ............................ 1540/CHE/2014
Jan. 13, 2015   (IN) .............................. 202/CHE/2014

(51) Int. Cl.
*H04W 12/04* (2009.01)
*H04W 76/15* (2018.01)
(Continued)

(52) U.S. Cl.
CPC ........... *H04W 12/04* (2013.01); *H04L 5/0048* (2013.01); *H04W 12/12* (2013.01); (Continued)

(58) Field of Classification Search
None
See application file for complete search history.

(56) References Cited

U.S. PATENT DOCUMENTS

2002/0159444 A1   10/2002  Vialen et al.
2007/0258591 A1   11/2007  Terry et al.
(Continued)

FOREIGN PATENT DOCUMENTS

CN    103517355 A    1/2014
CN    104936170 A    9/2015
(Continued)

OTHER PUBLICATIONS

International Search Report dated Apr. 21, 2015 in connection with International Patent Application No. PCT/KR2015/000541, 4 pages.
(Continued)

*Primary Examiner* — Frantz Bataille

(57) ABSTRACT

A system and method provide a security aspect for a UE in dual connectivity mode of operation in wireless communication networks. The system and method provide secure simultaneous transmission and reception in a secure manner between a User Equipment (UE) and one or more eNodeBs (eNBs) configured in an inter-eNB carrier aggregation scenario. The system establishes of a security context between the UE and the Secondary eNB (SeNB) using the RRC signaling between the UE and the Master eNB (MeNB), when a plurality of SCells within SeNB are added simultaneously. The system also detects the intruder in the user data radio bearers, while a UE is operating in dual connectivity mode of operation.

20 Claims, 13 Drawing Sheets

Related U.S. Application Data continuation of application No. 14/599,928, filed on Jan. 19, 2015, now Pat. No. 10,064,051.

(51) Int. Cl.
  *H04W 12/12* (2009.01)
  *H04L 5/00* (2006.01)
  *H04W 74/08* (2009.01)
  *H04W 80/02* (2009.01)

(52) U.S. Cl.
  CPC ....... *H04W 74/0833* (2013.01); *H04W 76/15* (2018.02); *H04W 80/02* (2013.01)

(56) References Cited

U.S. PATENT DOCUMENTS

| | | | |
|---|---|---|---|
| 2012/0099525 A1* | 4/2012 | Maheshwari | H04L 63/068 370/328 |
| 2013/0022016 A1 | 1/2013 | Wei | |
| 2013/0148490 A1 | 6/2013 | Yi et al. | |
| 2014/0071943 A1 | 3/2014 | Lee et al. | |
| 2014/0092785 A1 | 4/2014 | Song et al. | |
| 2015/0092750 A1 | 4/2015 | Huang et al. | |
| 2015/0124708 A1* | 5/2015 | Blankenship | H04W 36/0077 370/329 |
| 2015/0126154 A1 | 5/2015 | Yang | |
| 2017/0012997 A1 | 1/2017 | Wu et al. | |

FOREIGN PATENT DOCUMENTS

| | | |
|---|---|---|
| JP | 2003524336 A | 8/2003 |
| JP | 2013524701 A | 6/2013 |
| WO | 2007149509 A2 | 12/2007 |
| WO | 2012060565 A3 | 5/2012 |
| WO | 2013169073 A1 | 11/2013 |
| WO | 2013185579 A1 | 12/2013 |
| WO | 2014000610 A1 | 1/2014 |

OTHER PUBLICATIONS

Written Opinion of International Searching Authority dated Apr. 21, 2015 in connection with International Patent Application No. PCT/KR2015/000541, 6 pages.

Extended European Search Report issued for EP 15737608.8 dated Jan. 19, 2016, 9 pages.

Japanese Office Action dated Aug. 8, 2016 in connection with Japanese Application No. 2015-557965, 8 pages.

Foreign Communication from Related Counterpart Application; Japanese Patent Application No. 2015-557965; Notification of Reason for Rejection dated Jun. 5, 2017; 6 pages.

Foreign Communication from Related Counterpart Application; European Patent Application No. 15737608.8; Communication Pursuant to Article 94(3) EPC dated Aug. 7, 2017; 7 pages.

Communication from a foreign patent office in a counterpart foreign application, Text of Notification of the First Office Action, Chinese Application No. 201580000234.9, dated Jan. 11, 2018, 11 pages.

Communication from a foreign patent office in a counterpart foreign application, Text of Decision of Rejection, Japanese Application No. 2015-557965, dated Jan. 29, 2018, 7 pages.

Blackberry UK Limited, "Further Discussion on U-Plane Protocol Architecture Designs," R2-132442, 3GPP TSG RAN WG2 Meeting #83, Barcelona, Aug. 19-23, 2013, 6 pages.

Ericsson; "Application of the SeNB Initiated SeNB Modification Procedure for the SCG Change Procedure"; 3GPP TSG-RAN WG3 Meeting #85bis; R3-142448; Shanghai, P.R. China; Oct. 6-10, 2014; 6 pages.

Huawei et al.; "Security for SCE arc.1A"; 3Gpp TSG SA WG3 (Security) Meeting #74; S3-140026; Taipei(Taiwan); Jan. 20-24, 2014; 8 pages.

LTE Advanced, 3GPP TS 33A01 V12.7.0 (Mar. 2013), "3rd Generation Partnership Project; Technical Specification Group Services and System Aspects; 3GPP System Architecture Evolution (SAE); Security Architecture (Release 12)", 121 pgs.

NTT DOCOMO, Inc; "SCG Change Procedure Over X2"; 3GPP TSG-RAN3#85bis; R3-142397; Shanghai, China; Oct. 6-11, 2014; 6 pages.

Samsung; "S-KeNB Change Triggered by SeNB"; 3GPP TSG-RAN WG3 #85bis; R3-142307; Shanghai, P.R. China; Oct. 6-10, 2014; 3 pages.

Japan Patent Office, "Notification of Reason for Rejection," Application No. JP 2018-102785, dated Mar. 18, 2019, 10 pages.

3GPP TR 36-842 V1.0.0 (Nov. 2013), Technical Report, 3rd Generation Partnership Project; Technical Specification Group Radio Access Network; Evolved Universal Terrestrial Radio Access (E-UTRA); Study on Small Cell Enhancements for E-UTRA and E-UTRAN—Higher layer aspects (Release 12), Nov. 2013, 68 pages.

3GPP TS 33-107 V12.10.0 (Mar. 2015), Technical Specification, 3rd Generation Partnership Project; Technical Specification Group Services and System Aspects; 3G security; Lawful interception architecture and functions (Release 12), Mar. 2015, 229 pages.

Samsung, "Some security aspects of dual connectivity," R2-141603, 3GPP TSG RAN WG2 Meeting #85bis, Valencia, Spain, Mar. 31-Apr. 4, 2014, 4 pages.

European Patent Office, "Communication pursuant to Article 94(3) EPC," Application No. 15737608.8, dated Jun. 12, 2019, 8 pages.

Samsung, "Discussion on Security Aspects of SCE UP Architecture," R2-134278, 3GPP TSG RAN WG2 Meeting #84, San Francisco, USA, Nov. 11-15, 2013, 3 pages.

Appeal Decision in connection with Japanese Application No. 2015-557965 dated Dec. 2, 2019, 57 pages.

Decision of Rejection in connection with Japanese Application No. 2018-102785 dated Dec. 9, 2019, 6 pages.

3GPP TS 33A01 V12.10.0 (Dec. 2013), Technical Specification, 3rd Generation Partnership Project; Technical Specification Group Services and System Aspects; 3GPP System Architecture Evolution (SAE); Security architecture (Release 12), Dec. 2013, 4 pages.

Fujitsu, "General signalling flow for dual connectivity," R2-133999 Resubmission of R2-133210, 3GPP TSG-RAN WG2 Meeting #84, San Francisco, USA, Nov. 11-15, 2013, 2 pages.

Samsung, "Discussion on Security Aspects of SCE UP Architecture," S3-130989, 3GPP TSG-SA WG3 (Security) Meeting #73, San Francisco, USA, Nov. 11-15, 2013, 3 pages.

Samsung, "Discussion on Security Solution for 1A SCE UP Architecture," S3-140125, 3GPP TSG SA WG3 (Security) Meeting #74, Taipei, Taiwan, Jan. 20-24, 2014, 5 pages.

* cited by examiner

DUAL CONNECTIVITY MODE OF OPERATION OF A USER EQUIPMENT IN A WIRELESS COMMUNICATION NETWORK

CROSS-REFERENCE TO RELATED APPLICATIONS AND CLAIM OF PRIORITY

This application is a continuation of application Ser. No. 16/111,730, filed Aug. 24, 2018, which is a continuation of application Ser. No. 14/599,928 filed Jan. 19, 2015, now U.S. Pat. No. 10,064,051, which claims priority to provisional specification of Indian Application Number 202/CHE/2014, filed Jan. 17, 2014, Indian Application Number 1540/CHE/2014, filed Mar. 24, 2014, and complete specification of Indian Application Number 202/CHE/2014, filed Jan. 13, 2015, the disclosures of which are hereby incorporated by reference herein.

BACKGROUND

1. Field

The present application relates to the field of wireless communication and more particularly to security aspect for a User Equipment (UE) in dual connectivity mode of operation in wireless communication networks.

2. Description of Related Art

With rise in deployment of Long term Evolution (LTE) and LTE advanced (LTE-A), small cells using low power nodes such as a Pico cell and a Femto cell are considered promising to cope with mobile traffic explosion. A small cell using a low power node, which has transmission power (Tx) lower than macro node and Base Station (BS) classes, is preferred for hotspot deployments in indoor and outdoor scenarios resulting in enhanced performance.

The small cell enhancement for Evolved Universal Mobile Telecommunication System (UMTS) Terrestrial Radio Access Network (E-UTRAN) and E-UTRA focuses on additional functionalities for enhanced performance in hotspot areas for indoor and outdoor using the low power nodes.

The 3$^{rd}$ Generation Partnership Project (3GPP) is considering use of potential higher layer technologies for enhanced support of small cell deployments in Evolved (Universal Mobile Telecommunications System (UMTS) Terrestrial Radio Access (E-UTRA) and E-Evolved UMTS Terrestrial Radio Access Network (UTRAN) to fulfill the deployment scenarios and the requirements specified in TR 36.932.

3GPP is considering a deployment scenario, in which different frequency bands are separately assigned to macro layer and small cell layer, respectively. Small cell enhancement is expected to support significantly increased user throughput for both downlink and uplink with main focus on typical user throughput, considering a reasonable system complexity. Small cell enhancement is expected to target the capacity per unit area (such as in bps/km2) to be as high as possible, for a given user and small cell distribution, typical traffic types and considering a reasonable system complexity. The small cell enhancements are also expected to consider the impact of the actual backhaul delays and provide solutions with the aim of improved system performance. Other aspects, for example service quality of Voice over Long Term Evolution (LTE) (VoLTE), such as Mean Opinion Score (MOS) and delay or jitter impacts on services, such as video streaming, video calls and so forth, could also be addressed later.

In LTE Release-10 carrier aggregation, all the component carriers involved in carrier aggregation is handled at the same evolved NodeB (eNB) (co-located) and the component carriers are from the same frequency band i.e. intra-band carrier aggregation. In LTE Release-11 specification supports inter-band carrier aggregation where the component carriers are from different frequency bands. In the inter-band carrier aggregation scenario the component carrier (F1) from a lower frequency band can provide coverage and mobility whereas the other component carrier (F2) from a higher frequency band can provide high throughput to the User Equipment (UE). The inter-band carrier aggregation could be non-co-located, where the UE is carrier aggregated with at least one first serving frequency by a Master eNB (MeNB) and at least one second serving frequency served by a Secondary eNB (SeNB). When carrier aggregation between at least one cell controlled by two geographically separated eNBs is envisioned then it is called as inter-eNB carrier aggregation and the UE is said to be configured with dual connectivity mode of operation. In such a scenario, dual connectivity is envisioned such that the UE maintains physical links with at least one cell controlled by two geographically separated eNBs. The UE maintains dual connectivity both in downlink and uplink or only downlink. In uplink the dual connectivity towards the MeNB and the SeNB could be simultaneous or could be time multiplexed.

In the so-called dual connectivity mode of operation, the UE consumes radio resources provided by two different network nodes, namely MeNB associated with at least one first serving frequency and SeNB associated with at least one second serving frequency, connected via a non-ideal backhaul interface, such as X2 interface. The MeNB is the eNB that hosts the Radio Resource Control (RRC) layer and a single S1-MME termination point exists for a UE configured with dual connectivity mode of operation between the Mobile Management Entity (MME) and the E-UTRAN. The MeNB, therefore, acts as a mobility anchor towards the core network (CN). The E-UTRAN architecture and related functions to support Dual Connectivity for E-UTRAN is further described in TS 36.300.

In existing security mechanisms for single connectivity or UE supporting Release-10 or Release-11 carrier aggregation, authentication and authorization are performed using the authentication and key agreement procedure (AKA) defined for the evolved Universal Terrestrial Radio Access Network (E-UTRAN) in the LTE Networks. An initial security key is derived by the Mobility Management Entity (MME) in the core network and sent to a serving or source eNB of the UE. During an inter-eNB (S1 or X2-initiated) handover, the serving eNB derives the security key for a target eNB, using a base security key (if an interface such as an X2 interface exists between the serving eNB and the target eNB), to which the UE is handed over due to mobility. The security key provided by the serving eNB is used for deriving further keys in the target eNB, which are used for user plane data protection (same like serving eNB, UE derives the security key and further keys like target eNB).

During a handover (HO), using vertical key derivation, that is, the unused next hop (NH) parameters can be used for deriving the base security key at the source eNB (when S1 interface is involved in HO procedure). For dual connectivity, the existing procedure using vertical key derivation, a new security key associated with the secondary eNB (SeNB) for the UE can be derived at the Master eNB (MeNB) using unused Next Hop (NH) parameters. However, the unused NH parameters may not be always available at the MeNB to derive the security key associated with SeNB using vertical key derivation. In existing security mechanism during HO an existing security key associated with the source eNB can be used for deriving the base security key. For dual connectivity, this principle can be extended such that the existing security key of the MeNB can be used as for deriving the security key for the SeNB. The use of the MeNB security key for deriving the security key of SeNB for securing the communication between the SeNB and the UE may not provide adequate key separation and also possible key stream repetition issue, resulting in security compromise.

Further, if the MeNB derives security key for the SeNB using an existing security key, then the key repetition will occur. For example, if each time the same SeNB is removed and added again for supporting dual connectivity, the security key generated may be repeated. Further key repetition may also occur if the first SeNB is removed and another different second SeNB is added, but the first SeNB and second SeNB operate on the same frequency and have the same physical cell identity (PCI). Another scenario for key repetition occurrence is when the user plane data handled by the data radio bearer (DRB) established on the SeNB experience PDCP COUNT wrap around (that is, when same PDCP Count value with same DRB-ID and security key are used again (more than once), it is possible to derive the key stream or message details). Therefore, key stream repetition is highly possible when the existing security mechanism defined in TS 33.401 is used for dual connectivity and leads to exposing the user plane to security attacks, which needs to be avoided.

In addition to key repetition, the security capabilities and/or local configuration of the SeNB may be different from the MeNB. Hence, the UE configured with dual connectivity may need to use different cryptographic algorithms for communicating with the SeNB. The establishment of security context between the SeNB and the UE requires knowledge of the security algorithms supported and selected by the MeNB.

When there is no restriction to add only one SCell in the SeNB at a time, that is, it is allowed to add more than one SCell in the SeNB at initial configuration of the SeNB, then using the existing HO security mechanism for Dual connectivity, the MeNB should know the PCI and operating downlink frequency (EARFCN-DL) of one of the SCell within the SeNB to be used to derive the security key for the SeNB.

When the PDCP count of any PDCP entity handling the DRB in MeNB is about to wrap around then the MeNB could initiate intra-cell handover (i.e., handover to the same MeNB cell) to refresh the MeNB key, then the MeNB would have to release all the SCells in the SeNB at the same time in order to ensure that security key of SeNB is also updated (based on refreshed MeNB key). When the security key of the MeNB is updated while the SeNB continues to use existing security key that was derived from previous security key of the MeNB, then this may result in security compromise and, hence, it is not a good security practice (to use secondary keys derived from primary key which is invalidated). When the PDCP count of any PDCP entity handling the DRB in the SeNB is about to wrap around, then key repetition occurrence is possible when the user plane data handled by the data radio bearer (DRB) established on the SeNB experience PDCP COUNT wrap around (that is same PDCP Count value with same DRB-ID and security key are used again (more than once)).

Limitations and disadvantages exist in the operation and management of security mechanism such as countercheck procedure execution for DRB established in the SeNB for a UE configured with dual connectivity mode of operation that can lead to a potential compromise in security. Existing countercheck procedure does not address the issue of intruder detection in dual connectivity, as the SeNB does not have direct RRC signaling connection with the UE. There needs to be a method to check the PDCP counter associated with the SeNB, for whether an packet injection attack is mounted and also possibly flag the DRB-IDs with the indication indicating which node is responsible for handling the DRB and providing the UE the means to identity the correct DRB context used in the MeNB or SeNB.

In legacy LTE systems (namely, Release 8 to Release 11), the countercheck procedure is specified in 3GPP specification TS 36.331 (section 5.3.6) for detecting packet injection attack, where the RRC procedure is kind of audit where eNB checks if the PDCP COUNT provided by the UE for the established DRBs match with the values sent by the eNB in the request message of the procedure. If such an intruder attack is detected, then the network can decide to release the RRC connection immediately and can initiate other procedure like informing network node about the attack. For Release-10 carrier aggregation (CA), the primary cell (PCell) of the UE initiates the countercheck procedure for the DRB established on the SCell(s). This principle cannot be applied for dual connectivity where the RRC layer sits in the MeNB and there is no context or information about the PDCP entity in the SeNB available with the MeNB.

Compared to Release-10 CA, the extension of countercheck procedure for dual connectivity requires new signaling support on the X2 interface and also in the RRC signaling between the UE and the MeNB.

SUMMARY

The aspect of the embodiments herein is to provide secure simultaneous transmission and reception in a secure manner between a User Equipment (UE) and one or more eNodeBs (eNBs) configured in an inter-eNB carrier aggregation scenario.

Another aspect of the disclosure is to propose methods and systems for establishment of a security context between the UE and the SeNB using the RRC signaling between the UE and the MeNB, when a plurality of SCells within SeNB are added simultaneously.

Another aspect of the disclosure is to propose methods and systems for establishment or updating of a security context between the UE and the SeNB using the X2 signaling between the MeNB and SeNB and RRC signaling between the UE and the MeNB, when the PDCP COUNT of at least one DRB established on at least one second serving frequency served by the SeNB is about to wrap around.

Another aspect of the disclosure is to propose methods and systems for establishment or updating of a security context between the UE and the SeNB using the X2 signaling between the MeNB and SeNB and RRC signaling between the UE and the MeNB, when the SCell configured for the UE with PUCCH resources on at most one second serving frequency served by the SeNB is changed.

Another aspect of the disclosure is to propose methods and systems for establishment or updating of a security context between the UE and the SeNB using the X2 signaling between the MeNB and SeNB and RRC signaling between the UE and the MeNB, when the cryptographic algorithms used by the UE and the SeNB to be changed.

Another aspect of the disclosure is to propose a mechanism to detect the intruder (packet injection) in the data radio bearers using the X2 signaling between the MeNB and SeNB and RRC signaling between the UE and the MeNB, when the UE is operating in dual connectivity mode of operation.

In accordance with an aspect of the present disclosure, a method is provided for performing a change of a serving cell group (SCG) in a wireless communication system supporting a dual connectivity of a user equipment, the method comprises transmitting, by a secondary base station for the dual connectivity, a message including information indicating the change of the SCG to a master base station for the dual connectivity, to perform the change of the SCG, and receiving, by the secondary base station, a security key associated with the secondary base station, the security key being refreshed by the change of the SCG.

In accordance with another aspect of the present disclosure, a secondary base station is provided for performing a change of a serving cell group (SCG) in a wireless communication system supporting a dual connectivity of a user equipment, the secondary base station comprises a communication interface configured to communicate with other network entity, and a controller configured to control transmitting a message including information indicating the change of the SCG to a master base station for the dual connectivity, to perform the change of the SCG, and receiving a security key associated with the secondary base station, the security key being refreshed by the change of the SCG.

In accordance with further aspect of the present disclosure, a method is provided for performing packet data convergence protocol (PDCP) counter check of a serving cell group (SCG) in a wireless communication system supporting a dual connectivity of a user equipment, the method comprises receiving, by a master base station for the dual connectivity, a request message including information for checking a PDCP count from a secondary base station for the dual connectivity, the PDCP count being associated with a SCG radio bearer of the secondary base station, and performing, by the master base station in response to the request message, a PDCP counter check procedure to verify a value of the PDCP count, based on the received information.

In accordance with further aspect of the present disclosure, a master base station is provided for performing packet data convergence protocol (PDCP) counter check of a serving cell group (SCG) in a wireless communication system supporting a dual connectivity of a user equipment, the base station comprises a communication interface configured to communicate with other network entity, and a controller configured to control receiving a request message including information for checking a PDCP count from a secondary base station for the dual connectivity, the PDCP count being associated with a SCG radio bearer of the secondary base station, and performing, in response to the request message, a PDCP counter check procedure to verify a value of the PDCP count, based on the received information.

Also, provided herein is a method for creating a secure connection for a User Equipment (UE) in a wireless communication network operating in a dual connectivity mode, the wireless communication network comprising of a first evolved NodeB (eNB) connected to a second eNB by an X2 interface, wherein the UE is carrier aggregated with at least one first serving frequency served by the first eNB and at least one second serving frequency served by the second eNB. The method includes sending a first Radio Resource Control (RRC) message to the UE by the first eNB. The method also includes, by the first eNB, receiving an indication from the second eNB, wherein the RRC message comprises one of instructions to the UE to update security base key associated with the second eNB and to check a PDCP count associated with at least one Data Radio Bearer (DRB) established on at least one of the first eNB and the second eNB.

Also, provided herein is a wireless communication network including at least one first evolved NodeB (eNB) connected to at least one second eNB by an X2 interface and at least one User Equipment (UE) operating in a dual connectivity mode. The UE is carrier aggregated with at least one first serving frequency served by the first eNB and at least one second serving frequency served by the second eNB. The first eNB is configured for sending a Radio Resource Control (RRC) message to the UE. The first eNB receives an indication from the second eNB, wherein the RRC message comprises one of instructions to the UE to update security base key associated with the second eNB and to check a PDCP count associated with at least one Data Radio Bearer (DRB) established on at least one of the first eNB and the second eNB.

Provided herein is a first evolved NodeB (eNB) in a wireless communication network. The first eNB is connected to at least one second eNB by an X2 interface and at least one User Equipment (UE) operating in a dual connectivity mode. The UE is carrier aggregated with at least one first serving frequency served by the first eNB and at least one second serving frequency served by the second eNB. The first eNB is configured to send a first Radio Resource Control (RRC) message to the UE. The first eNB receives an indication from the second eNB, wherein the RRC message comprises one of instructions to the UE to update security base key associated with the second eNB and to check a PDCP count associated with at least one Data Radio Bearer (DRB) established on at least one of the first eNB and the second eNB.

Provided herein is a second evolved NodeB (eNB) connected to a wireless communication network, wherein the second eNB is connected to at least one first evolved NodeB (eNB) by an X2 interface and at least one User Equipment (UE) operating in a dual connectivity mode. The UE is carrier aggregated with at least one first serving frequency served by the first eNB and at least one second serving frequency served by the second eNB. The second eNB is configured to provide Data Radio Bearer (DRB) identity of at least one DRB established on at least one the second serving frequency served by the second eNB and associated PDCP count values in a X2 message. The first eNB executes countercheck procedure towards the UE for at least one DRB associated with the second eNB upon receiving a second indication by the first eNB from the second eNB over the X2 interface. The second indication indicates execution of countercheck procedure for at least one DRB established on at least one the second serving frequency served by the second eNB.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
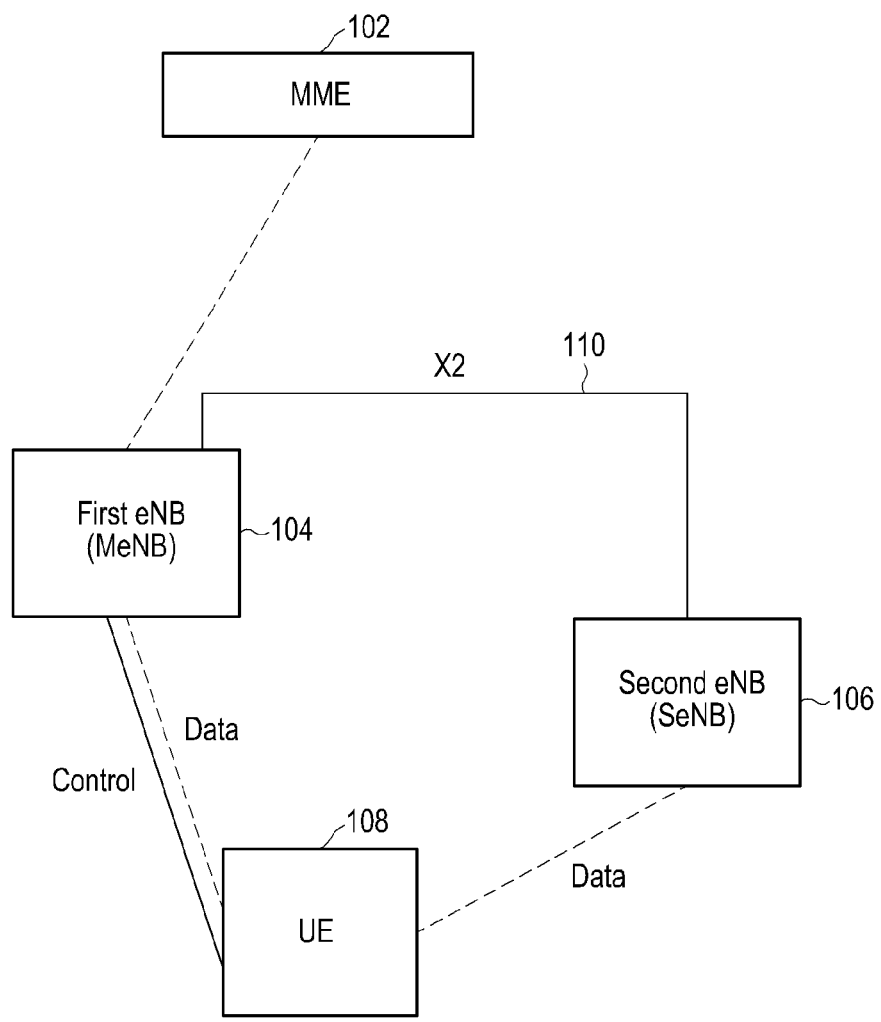
FIG. 1 illustrates an inter-evolved node B (eNB) carrier aggregation in a wireless communication network system according to embodiments of the present disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system. The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

Throughout the document, the terms "first evolved Node B" (first eNB), "Master eNB (MeNB)", "primary eNB", and "anchor eNB" are used interchangeably and may refer to a single eNB that connects a User Equipment (UE) to the core network, which terminates at least S1-MME interface. Throughout the document, the terms "second eNB", "Secondary eNB (SeNB)", "small eNB", and "Drift eNB" are used interchangeably and may refer to an eNB that serves the UE to enhance data throughput at the UE (but not the MeNB). Throughout the document, the terms "Second eNB Change Counter (SCC)", "S-Count Counter (SCC)", "Secondary Cell Counter", "Secondary Cell Group (SCG) Counter", and SCG counter are used interchangeably and refer to a freshness parameter maintained at the first eNB for deriving SeNB base key. Throughout the document, the terms "refresh", "rekeying" and "update" have been used interchangeably and may refer to the derivation of a fresh security base key associated with the SeNB. Throughout the document, the term "KeNB_m" or "KeNB_M" refer to the key KeNB specified in 3GPP Technical Specification (TS) 33.401, which is used by the MeNB and the UE to derive further keys to protect the communication between them and may also for derivation of SeNB base key. Throughout the document, the term "KeNB_s", "KeNB_S", "KeNB_S*" and "KeNB_s*" refer to the key S-KeNB, which is used by the SeNB and the UE to derive further keys to protect the communication between them. Throughout the document, the term "serving cell configured with PUCCH resources", "Special SCell", "PSCell" and "pSCell" have been used interchangeably and may refer to at most one serving cell on at least one second serving frequency served by the SeNB. Throughout this document, the term "counter", "PDCP COUNT", "PDCP Sequence number" and most significant parts of the PDCP COUNT values are used interchangeably.

Embodiments of the present disclosure achieve security in dual connectivity mode of a User Equipment in a wireless communication network. Certain embodiments provided a method and system for creating a secure connection for the UE in a wireless network including the first eNB connected to the second eNB. The UE is carrier aggregated with at least one first serving frequency served by the first eNB and at least one second serving frequency served by the second eNB. At the first eNB, a security base key associated with the second eNB is derived using a freshness parameter during at least for one of the following: addition of plurality of SCells within a second eNB, update of the security base key of first eNB, update of the security base key of second eNB, change of cryptographic algorithms and change of serving cell configured with PUCCH resources on, at most, one second serving frequency served by the SeNB. The security base key associated with second eNB is generated based on a security base key associated with the first eNB and a freshness parameter associated with the security context of the first eNB. At the second eNB, a user plane encryption key is derived based on the security base key associated with the second eNB received from the first eNB for encrypting data transfer over at least one data radio bearer established on at least one serving cell associated with the second eNB. The freshness parameter is informed to the UE for deriving the security base key associated with the second eNB and further deriving a user plane encryption key for securing data transfer between the UE and the SeNB. Further, the SeNB provides to the first eNB the DRB identity and PDCP COUNT corresponding to at least one DRB established on at least one serving cell associated with second eNB to execute the counter check procedure towards the UE.

Referring now to the drawings, and more particularly to FIGS. 1 through 12, where similar reference characters denote corresponding features consistently throughout the figures, there are shown preferred embodiments.

FIG. 1 illustrates an inter-evolved node B (eNB) carrier aggregation in a wireless communication network system 100 such as that of 3GPP's Long Term Evolution (LTE), according to embodiments of the present disclosure. The embodiment of the wireless communication network system 100 is for illustration only. Other embodiments could be used without departing from the scope of the present disclosure.

The wireless communication network system 100 includes a Mobility Management Entity (MME) 102, a first eNB (MeNB) 104, a second eNB (SeNB) 106, and a User Equipment (UE) 108 with inter-eNB carrier aggregation. The MME 102 manages session states, authentication, paging, mobility with 3GPP, 2G and 3G nodes, roaming, and other bearer management functions. The UE 108 can be a mobile phone, a tablet, a wearable computing device, a communication dongle or any other device capable of connecting and communicating over a wireless communication network system 100. In certain embodiments, the UE 108 is capable of operating in a dual connectivity mode of operation simultaneously connected to the MeNB 104 and the SeNB 106.

The MeNB 104 can be a macro eNB, a primary eNB, a first eNB, a anchor eNB or any other eNB capable of being a part of a wireless communication network system 100 and serving at least one cell served on a first carrier frequency (F1) to the UE 108. The SeNB 106 can be a secondary eNB, a small eNB, a drift eNB or any other eNB capable of being a part of a wireless communication network system 100 and serving at least one cell served on a second carrier frequency (F2) to the UE 108. In certain embodiments, the MeNB and SeNB are parts of the same wireless communication network system 100 and can be connected to each other at the backend through a non-ideal backhaul such as X2 interface 110 and communicate using the X2 application protocol (X2-AP). The UE 108 is configured to be connected to at least one of the MeNB 104 and SeNB 106 using an air interface. There can be plurality of SeNBs and MeNBs present in the wireless communication network system 100. The wireless communication network system 100 is only one example of a suitable environment and is not intended to suggest any limitation as to the scope of use or functionality of the disclosure.

In certain embodiments, the MeNB 104 is connected to the SeNB 106 with an interface characterized by one of a non-ideal backhaul link and an ideal backhaul link. The UE 108 is carrier aggregated with at least one first serving frequency (F1) served by the MeNB 104 and at least one second serving frequency (F2) served by the SeNB 106 and configured to operate in dual connectivity mode of operation in at least one of a downlink direction and an uplink direction with the MeNB 104 and SeNB 106. In certain embodiments, the wireless communication network system 100 uses a set of data radio bearers (DRBs) for the UE 108 that is transmitted over the MeNB 104, while another set of data radio bearers (DRBs) for the UE 108 is transmitted over the SeNB 106. When the MeNB 104 and the SeNB 106 serve the UE 108, the MeNB 104 handles the control plane of the UE 108 while the user plane handling of the UE 108 gets either distributed or split between the MeNB 104 and the SeNB 106.

Figure 2A:
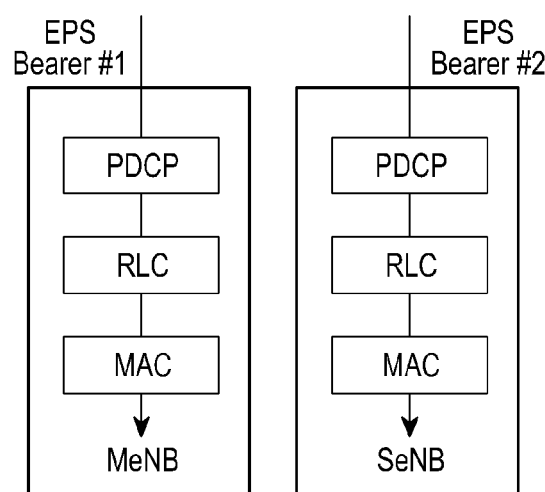
FIGS. 2A and 2B illustrate protocol architectures for dual connectivity under consideration in 3GPP specification TR 36.842 according to embodiments of the present disclosure.
Figure 2B:
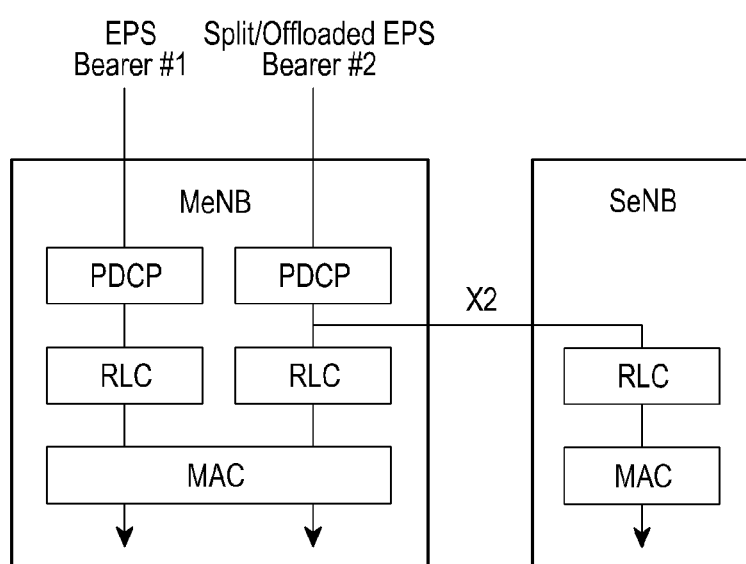

FIGS. 2A and 2B illustrate protocol architectures for dual connectivity under consideration in 3GPP specification TR 36.842, according to embodiments of the present disclosure. The embodiments of the protocol architectures shown in FIGS. 2A and 2B are for illustration only. Other embodiments could be used without departing from the scope of the present disclosure.

FIG. 2A illustrates a core network (CN) split architecture from eNB perspective, according to embodiments of the present disclosure. The S1-U terminates at the MeNB 104 and the SeNB 106. This architecture is referred as core network (CN) split where a set of Evolved Packet System (EPS) bearers of the UE 108 are split in the core network at the Service-Gateway (S-GW) and the EPS bearers are mapped on the respective S1-U interfaces towards the MeNB 104 and the SeNB 106. The respective EPS bearers are mapped on to corresponding data radio bearers (DRBs) of the MeNB 104 and the SeNB 106.

FIG. 2B illustrates Radio Access Network (RAN) split architecture from eNB perspective, according to embodiments of the present disclosure. The S1-U terminates only at the MeNB 104. This architecture is referred as radio access network (RAN) split where the EPS bearer #2 of the UE 108 is split in the MeNB 104 and the offloaded bearer is mapped on the X2 interface towards the SeNB 106. The layer 2 protocol stack for the data radio bearer associated with the MeNB 104 (EPS Bearer #1 and Split EPS Bearer #2) and the SeNB 106 (Offloaded EPS Bearer #2) includes an independent PDCP entity per bearer at the MeNB, an independent Radio Link Control (RLC entity) per bearer at the MeNB 104 and SeNB 106, and a common Medium Access Control (MAC) entity at the MeNB 104 and an independent MAC entity at the SeNB 106. The split/offloaded data radio bearer associated with the MeNB 104 (EPS Bearer #2) and also associated with the SeNB 106 can be handled by the PDCP entity associated with MeNB 104 called the common PDCP entity. Further, the MeNB 104 includes an RRC protocol for control signaling. The layer 2 protocol stack associated with the MeNB 104 and SeNB 106 for handling the data radio bearers associated with the MeNB 104 and SeNB 106, which includes the MAC entity, the RLC entity. The PDCP entity as shown in FIG. 2A and FIG. 2B is also duplicated at the UE 108 from the UE perspective and, hence, is not shown explicitly for simplicity.

Figure 3:
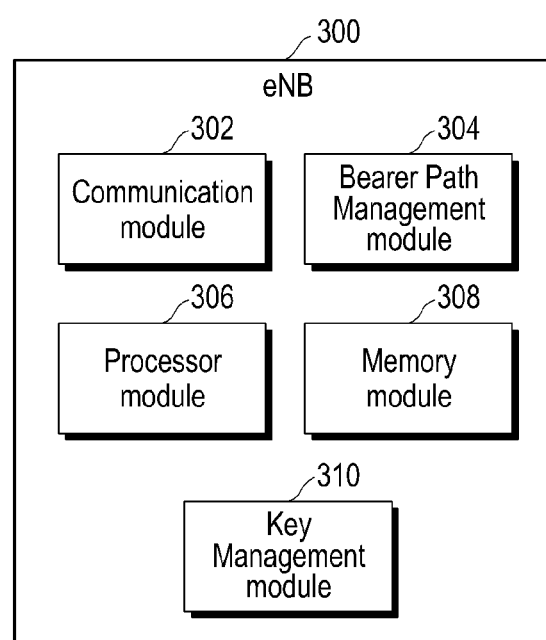
FIG. 3 illustrates an eNodeB according to embodiments of the present disclosure.

FIG. 3 illustrates an eNodeB (which can be at least one of a MeNB or a SeNB), according to embodiments of the present disclosure. The embodiment of the eNB 300 shown in FIG. 3 is for illustration only. Other embodiments could be used without departing from the scope of the present disclosure. The eNB 300 shown in FIG. 3 can be either the MeNB 104 or the SeNB 106. In certain embodiments, both the MeNB 104 and the SeNB 106 are configured the same as, or similar to, the eNB 300

The primary blocks present in an eNB 300 for communication in dual connectivity of the UE 108 comprise a communication module 302, a bearer path management module 304, a processor module 306, a memory module 308, and a key management module 310. In certain embodiments, the communication module 302 is configured to communicate security information with the UE 108 and other eNBs for establishing a security context. For example, the wireless communication module 302 in a MeNB 104 can be configured to communicate the security base keys with one or more UEs 108.

The bearer path management module 304 determines the bearer to be transmitted over within respective cells in the eNBs. The bearer described herein can either be a Data Radio Bearer (DRB) or a Signaling Radio Bearer (SRB). The selection of a bearer can be based on a plurality of variables, which include, but are not limited to, Quality of Service requirements (QoS), traffic characteristics of the bearer, load and coverage area of a selected secondary cell and so forth.

The key management module 310 is configured to derive or receive keys, or both, from a plurality of entities. In certain embodiments, the key management module 310 is configured to generate further security keys based on a received key. The MeNB 104 receives a base security key from the MME 102 and derives a security base key for SeNB 106. Similarly, the SeNB 106 uses the security key received from the MeNB 104 to derive new security key to be used for secure communication with the UE 108. The derived security base key for the SeNB 106 can be sent from the MeNB 104 through the X2 interface using an X2 message.

Further, in certain embodiments, the memory module 308 is configured to store data related to operation of the eNBs, such as operations of one or both of MeNB 104 and SeNB 106, and the UE 108. The memory module 308 can be configured to store various security keys generated for communication with different entities.

Figure 4:
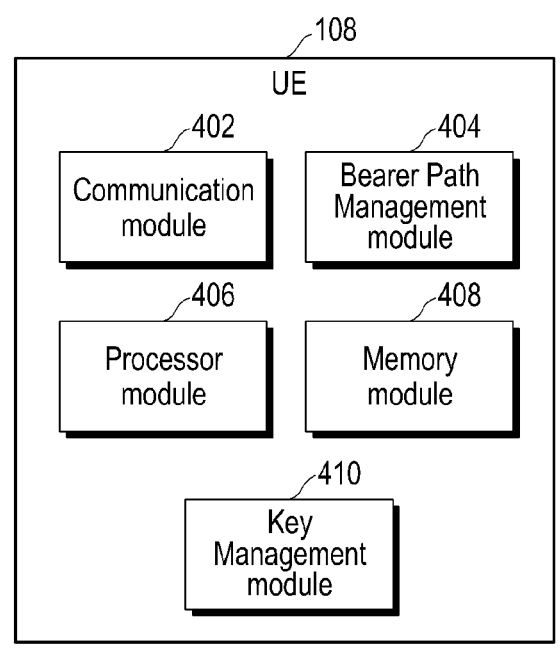
FIG. 4 illustrates a UE configured to operate in dual connectivity mode, according to embodiments of the present disclosure.

FIG. 4 illustrates a UE configured to operate in dual connectivity mode, according to embodiments of the present disclosure. However, UEs come in a wide variety of configurations, and FIG. 4 does not limit the scope of this disclosure to any particular implementation of a UE.

The primary blocks present in the UE 108 for communication in dual connectivity include a communication module 402, a bearer path management module 404, a processor module 406, a memory module 408, and a key management module 410. In certain embodiments, the communication module 402 is configured to communicate security information with the eNBs, such as MeNB 104, a SeNB 106, or both, for establishing a security context. For example, the wireless communication module 402 in a UE 108 can be configured to communicate protected user plane packets with one or more eNBs. In certain embodiments, the wireless communication module 402 in a UE 108 is able to communicate simultaneously with one or more eNBs.

The bearer path management module 404 determines the bearer to be transmitted over within respective cells in the eNBs. The bearer described herein can either be a Data Radio Bearer (DRB) or a Signaling Radio Bearer (SRB). The selection of a bearer can be based on a plurality of variables, which include, but are not limited to, Quality of Service requirements (QoS), traffic characteristics of the bearer, load and coverage area of a selected secondary cell and so on.

The key management module 410 is configured to derive keys for a plurality of entities such as the eNBs and MME.

Further, the memory module 408 is configured to store data related to operation of the eNBs, such as MeNB 104 and SeNB 106, and the UE 108. The memory module 408 can be configured to store various security keys generated for communication with different entities, as received by the key management module 410.

Embodiments of the present disclosure provide a system and method to establish security context for inter-eNB carrier aggregation. Specifically, certain embodiments provide a system and method for key separation and security handling between MeNB and SeNBs. The SeNB 106 can include a key refresh flag in the SeNB release request message towards the MeNB. In certain embodiments, the SeNB 106 initiates a key refresh request message towards MeNB for refreshing KeNB_s key (based on events such as PDCP wrap around, cryptographic algorithm to be changes, primary secondary Cell (pSCell) to be changed and like so). Also, in certain embodiments, the UE 108 initiates a key refresh request message towards MeNB for refreshing KeNB_s key. Consequently, the MeNB can indicate to the UE 108 the cell specific physical cell identity (PCI) and downlink frequency (EARFCN-DL) to be used as input parameter in key derivation function (KDF) when more than one SCell is added during SeNB addition procedure and PCI and EARFCN-DL is used as the input parameters. In certain embodiments herein, a security context establishment is enabled between the SeNB 106 and the UE 108 using the RRC signaling between the UE 108 and the MeNB 104. In certain embodiments, assistance information is provided over the X2 interface in the form of cell list and the associated RRM measurement (RSRP/RSRQ measurements) meets the threshold criteria for qualifying to be potential pSCell within the SCG; and assistance information is provided over the X2 interface in the form of cell list and the associated physical resource availability meets the criteria for qualifying to be potential pSCell within the SCG.

Certain embodiments of the present disclosure provide a system and method for intruder detection in dual connectivity mode of operation of user equipment. Certain embodiments of the present disclosure provide a mechanism for intruder detection for user plane traffic bearer of a User Equipment (UE) in an inter-eNB carrier aggregation scenario. The method includes providing assistance information over the X2 interface related to DRB-ID and PDCP COUNT associated with DRB handled by the SeNB 106 for both uplink and downlink DRBs, can include flagging DRB-IDs in countercheck request message either by MCG or SCG indication depending on node handling the corresponding DRB.

Certain embodiments of the present disclosure disclose the MeNB initiating the countercheck procedure for the DRB established in the MeNB and further; it can also include the DRBs established in the SeNB 106.

Countercheck procedure can be supported for dual connectivity (for both RAN Split architecture and CN Split) with the MeNB initiating the procedure and verifying the result, the SeNB 106 initiating the procedure and verifying the result, or the SeNB 106 initiating the procedure and the MeNB verifying the result. From the above, the SeNB 106 initiating the procedure and the MeNB verifying the result can be a preferred procedure, since SeNB is handling the PDCP entity and the MeNB needs to be the decision making entity.

For initial SeNB addition procedure, the SeNB key derivation is based on current MeNB key in use (KeNB_m). The process, as depicted herein uses a SeNB Counter Count (S-Count or SCC) to ensure that SeNB key repetition does not occur. The specific parameters of the reference cell (pSCell) from the group of SCell (SCG cells) handled by the SeNB 106 also can be used in the SeNB key derivation.

The UE 108 sends the measurement report to the MeNB 104. The SeNB 106 also sends the resource status update to the MeNB 104 using the X2 interface. The resource status update includes the load information, radio problem and so forth. Based on information received from the UE 108 and the SeNB 106, the MeNB 104 selects the reference cell (pSCell). The MeNB 104 sends a SCellCommand to the SeNB 106, wherein the SCellCommand includes the ID of the selected pSCell to add or release, restrictions (if any) associated with the pSCell and so forth. The SeNB 106 sends a SCellConfig message to the MeNB 104 upon receiving the SCellCommand, wherein the SCellConfig includes an ScellToAddModList, security algorithm and so forth. The MeNB 104 sends an RRCConnectionReconfiguration message to the UE 108, wherein the RRCConnectionReconfiguration message includes a security configuration for the selected pSCell. In response to the RRCConnectionReconfiguration message, the UE 108 sends a response to the MeNB 104 in the form of an RRCConnectionReconfigurationComplete message. The MeNB 104 also sends a RACH (Random Access Channel) message to both the UE 108 and the SeNB 106. The MeNB 104 and the UE 108 generate a fresh SeNB key-chain (S-Count) that increments the S-Count. The MeNB 104 further sends a SCellConfigACK message to the SeNB 106, wherein the SCellConfigACK message includes an SeNB-Kenb (KENB_S). In response, the SeNB 106 sends a SCellCommandAck response to the MeNB 104.

The counter as disclosed herein is a special case of a nonce. A Nonce and Counter (S-Count or SCC) have been used interchangeably herein. The counter is incremented for every SeNB addition and in case of nonce, a new nonce is pseudo randomly generated for every SeNB addition.

The key derived for the SeNB 106 is applicable for all user plane traffic handled by all the SCells added in the SeNB 106. The terms MeNB key and MCG key and the terms SeNB key and SCG key have been used interchangeably herein.

Embodiments herein disclose a mechanism to retain old key in the SeNB 106 or refresh the new key in the SeNB 106, when KeNB_m is refreshed either due to change in the MeNB 104 or PDCP count of any PDCP entity in the MeNB 104 is about to wrap around.

Embodiments herein disclose a mechanism to avoid KeNB_s key change when multiple SCells are configured for the UE 108 and the special SCell for a particular UE 108 is changed.

Figure 5:
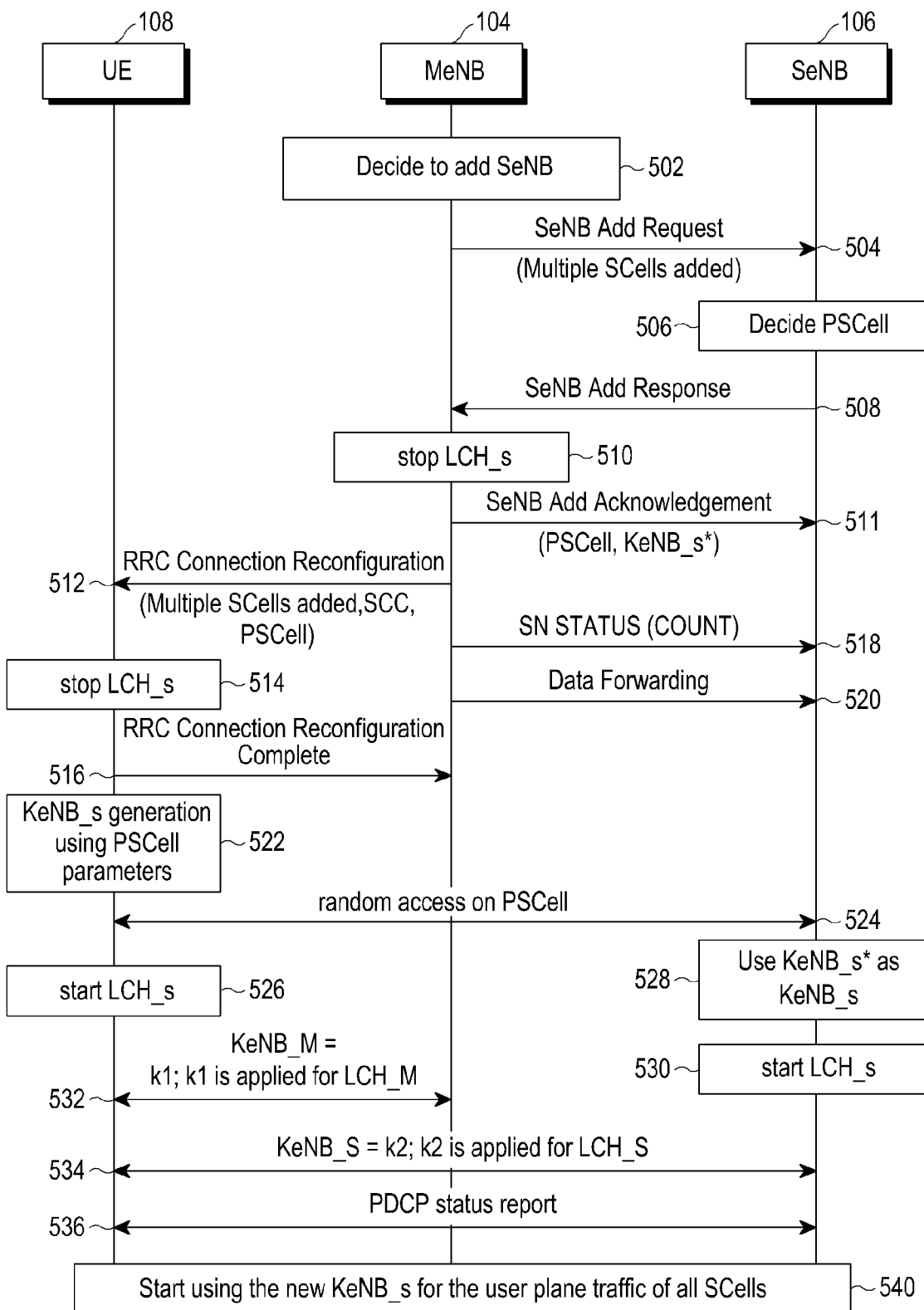
FIG. 5 illustrates an exemplary process of deriving KeNB_s* using pSCell parameters that are decided by SeNB according to embodiments of the present disclosure.

FIG. 5 illustrates an exemplary process of deriving KeNB_s* using pSCell parameters that are decided by the SeNB 106 according to embodiments of the present disclosure.

When multiple SCells are added simultaneously, the pSCell is the one on which the UE 108 performs random access. Upon deciding the pSCell, the SeNB 106 sends a SeNB Key request message to the MeNB 104 on the X2 interface providing the pSCell or the cell specific parameters. The MeNB 104 generates the KeNB_s* based on the indicated pSCell or cell specific parameters. The KeNB_s* is provided to the SeNB 106 in SeNB key response message.

Upon the MeNB 104 deciding to add a SeNB 106 502, the MeNB 104 sends a SeNB add request 504 to SeNB 106, wherein multiple SCells can be added based on the add request. The SeNB 106 sends a SeNB Add Response 508 message indicating the decided pSCell 506 from the plurality of added SCells, in response to the add request 504. Upon receiving the response message 508, the MeNB 104 stops LCH_s 510. The LCH_S or LCH_s is associated with the logical channel between the UE 108 and the SeNB 106. The LCH_S or LCH_s corresponds to the SCG bearers. The MeNB 104 sends a SeNB Add Acknowledgement 511 to SeNB 106. The MeNB 104 then sends a RRCConnectionReconfiguration message 512 to the UE, wherein the RRCConnectionReconfiguration message indicates that a new SeNB 106 has been added, multiple SCells have been added, the necessary parameters required for the key derivation (SCC), the pSCell and so on. Upon receiving the RRCConnectionReconfiguration message 512, the UE 108 stops the LCH_s 514 and sends a RRCConnectionReconfigurationComplete message 516 to the MeNB 104. In parallel, the MeNB 104 sends a SN Status message 518 to the SeNB 106. The MeNB 104 also starts forwarding data 520 to the SeNB 106. The UE 108 generates KeNB_s 522, based on parameters related to the PSCell, as communicated by the MeNB 104. The UE 108 performs random access 524 on one of the SCells from the plurality of added SCells, wherein the Scell on which the UE performs the random access procedure 524 is the PSCell indicated in the RRCConnectionReconfiguration message 512 from the MeNB 104. The UE 108 further starts LCH_s 526 for the added SCells. The MeNB 104 generates KeNB_s*, based on parameters related to the pSCell. The MeNB 104 then sends a SeNB Key (KeNB_s*) to the SeNB 106 in the SCG Add Acknowledgement message. Using KeNB_s* as KeNB_s 528, the SeNB 106 starts LCH_s 530. Also, the UE 108 and the MeNB 104 consider KeNB_M as k1 and k1 is applied for LCH_M 532. The LCH_M or LCH_m can be associated with the logical channel between the UE and the MeNB. The LCH_M or LCH_m corresponds to the MCG bearers. Also, the UE 108 and the SeNB 106 consider KeNB_S as k2 and k2 is applied for LCH_S 534. The MeNB 104 shares the PDCP (Packet Data Convergence Protocol) status report 536 with the SeNB 106 and the UE 108. The UE 108 and the SeNB 106 start using the new KeNB_s 540 to derive further keys, which can be used for protecting the user plane traffic of all SCells.

In certain embodiments, a method deriving the KeNB_s key independent of cell specific parameters is disclosed. According to this embodiment, the key derivation function independent of the cell specific parameters comprises: KeNB_s*=KDF{KeNB_m (in use), Random Seed, KeNB_s, <other possible parameters>} where the random seed could be a Nonce or/and a counter or/and PDCP COUNT of the PDCP entity handling the signaling bearer (SRB0 or SRB1) in the MeNB 104, which initiates the Key change in the UE 108. Here the KeNB_s* is derived not using any cell specific parameter. In the above key derivation function, other than Random seed and KeNB_m, all other parameters are optional.

If the Key derivation function (KDF) does not include PCI and EAFRCN-DL, which are cell specific parameters (but a random parameter like "Nonce or Counter or PDCP COUNT, or a combination thereof," and so on), even then if more than one SCell is added simultaneously, there would be no security issue in deriving cryptographically separate keys.

In certain embodiments, one of the <other possible parameters> mentioned in the key derivation function can be eNB ID of the SeNB 106 broadcasted in the SIB1 signaling message for KeNB_S* derivation. The eNB ID is already included in SIB1. The general understanding is that the 20 MSB of this 28 bit field identify the eNB.

In LTE up to Rel-11, upon every handover (HO) and re-establishment, the UE 108 derives new access stratum (AS) keys, such as KeNB, K_RRCint, K_RRCenc and K_UPenc. It is reasonable to assume the SeNB keys need to be updated whenever the MeNB key changes. Therefore the SeNB keys need to be updated upon MeNB key change, but whether this would result in SCG release and addition need to be considered. Given that MeNB 104 handover (HO) may be time critical, it may actually be preferable to release the SCG upon MeNB HO and re-establish it after HO completion. In certain embodiments, the release of SCG and subsequent addition would be similar to the user plane procedures during HO but restricted to SCG bearers, namely MAC entity handling the SCG is reset, PDCP entity is re-established and RLC entity is re-established.

In certain embodiments of the present disclosure, the SCG release and subsequent addition is a simple approach applicable for both SCG key refresh and MeNB key change due to MeNB handover (HO) or due to wrap around of the PDCP count of any PDCP entity handling the DRB in the MeNB 104 or in SeNB 106.

Figure 6:
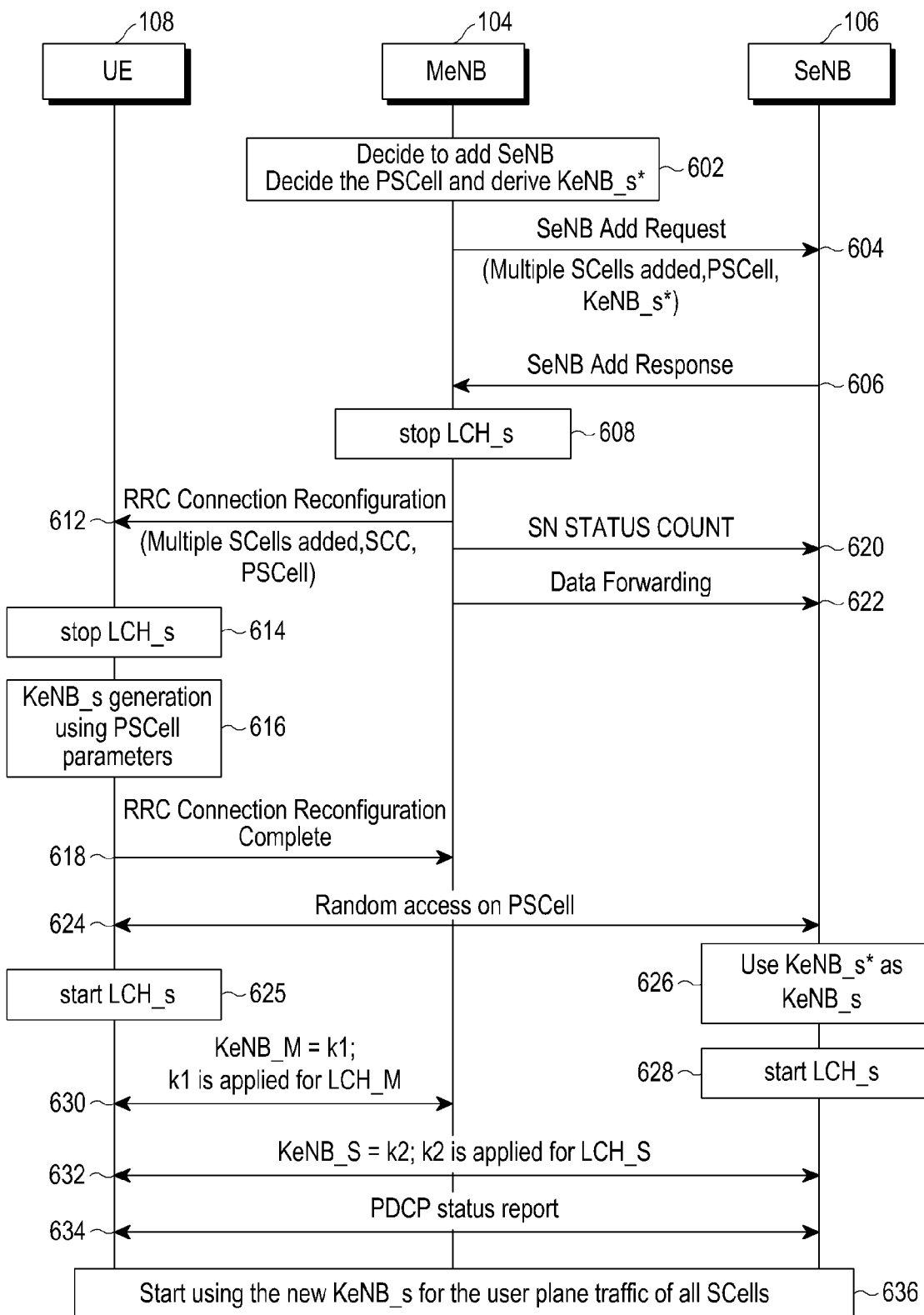
FIG. 6 illustrates an exemplary process of deriving KeNB_s* wherein the pSCell is decided by the MeNB, according to embodiments of the present disclosure.

FIG. 6 illustrates an exemplary process of deriving KeNB_s* using pSCell parameters, wherein the MeNB decides the PSCell, according to embodiments of the present disclosure.

When multiple SCells are added simultaneously, the pSCell is the one on which the UE 108 performs random access. The MeNB 104 generates the KeNB_s* based on the decided pSCell or cell specific parameters.

When the MeNB 104 decides 602 to add a SeNB 106, the MeNB 104 decides the PSCell and derives the KeNB_s*. The MeNB 104 sends a SeNB add request 604 to SeNB 106, wherein the add request can comprise of multiple SCells to be added, the decided PSCell and the derived KeNB_s*. The SeNB 106 sends a SeNB Add Response message 606, in response to the add request. Upon receiving the response message 606, the MeNB 104 stops LCH_s 608. The MeNB 104 then sends a RRCConnectionReconfiguration message 612 to the UE, wherein the RRCConnectionReconfiguration message 612 indicates that a new SeNB 106 has been added, multiple SCells have been added and so forth. upon receiving the RRCConnectionReconfiguration message 612, the UE 108 stops the LCH_s 614. The UE 108 generates KeNB_s 616, based on parameters related to the pSCell, as communicated by the MeNB 104 and sends a RRCConnectionReconfigurationComplete message 618 to the MeNB 104. In parallel, the MeNB 104 sends a SN Status message 620 to the SeNB 106, wherein the SeNB 106 includes the count. The MeNB 104 also starts forwarding data 622 to the SeNB 106. The UE 108 performs random access 624 on one of the SCell from the plurality of added SCells, wherein the Scell on which the UE performs the random access procedure is the pSCell indicated in the RRCConnectionReconfiguration message 618 from the MeNB 104. The UE 108 further starts LCH_s 625 for the added SCells. Using KeNB_s* as KeNB_s 626, the SeNB 106 starts LCH_S 628. Also, the UE 108 and the MeNB 104 consider KeNB_M as k1 and k1 is applied 630 for LCH_M. Also, the UE 108 and the SeNB 106 consider KeNB_S as k2 and k2 is applied 632 for LCH_S. The MeNB 104 shares the PDCP (Packet Data Convergence Protocol) status report 634 with the SeNB 106 and the UE 108. The UE 108 and the SeNB 106 start using the new KeNB_s 636 for the user plane traffic of all SCells.

Figure 7:
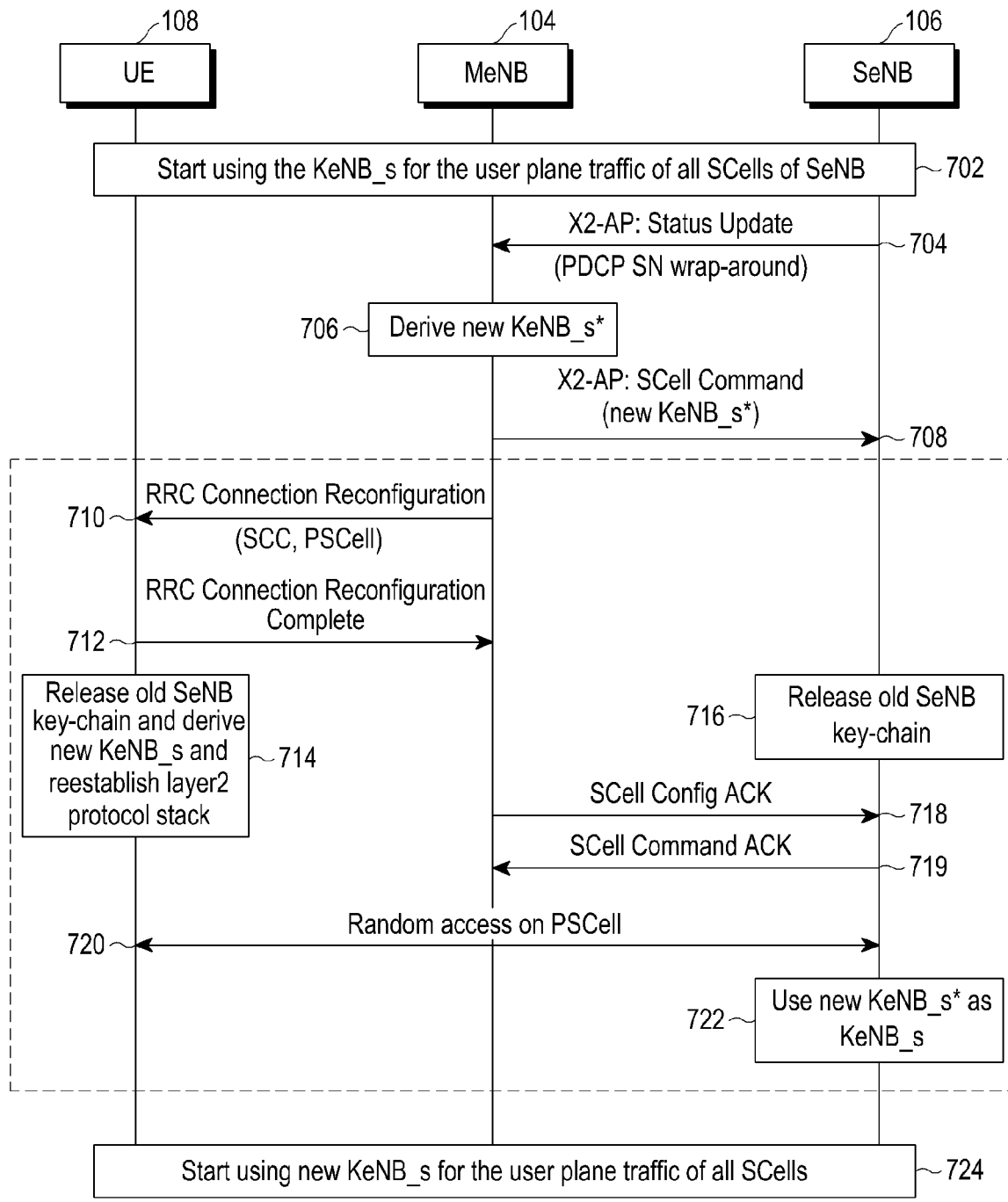
FIG. 7 illustrates an exemplary process of MeNB initiated SCG release and subsequent addition of the SCG for SeNB key refresh due to wrap around of PDCP count of any PDCP entity handling the DRB in the SeNB according to embodiments of the present disclosure.

FIG. 7 illustrates an exemplary process of MeNB initiated SCG release and subsequent addition of the SCG for SeNB key refresh due to wrap around of PDCP count of any PDCP entity handling the DRB in the SeNB, according to embodiments of the present disclosure.

The SCG release and subsequent addition of the same SCG, namely SCG release and addition procedure, means, the user plane protocol stack associated with the SeNB 106 is reset and reestablished 702 in the UE 108 and in the SeNB 106. The SeNB 106 sends a Resource Status Update (X2-AP status update) message 704 to the MeNB 104, wherein the Resource Status Update comprises of PDCP SN wrap-around status. In an embodiment, the X2-AP status update message 704 is a SeNB 106 modification required message with SCG Change Indication having a cause value as PDCP Count Wrap Around. Upon receiving the SeNB modification required message, the MeNB 104 derives a new KeNB_s* 706. The MeNB 104 sends a SCell Command message (X2-AP message 708, for example, SeNB modification request) comprising of the new KeNB_s* to the SeNB 106. The MeNB 104 further sends the RRCConnectionReconfiguration message 710 to the UE 108. The MeNB 104 includes the necessary parameters (SCC) in the RRCConnectionReconfiguration for the UE 108 to update the KeNB_s. Upon receiving this message, the UE 108 updates (derives) the key KeNB_s and sends the RRCConnectionReconfigurationComplete message 712 to the MeNB 104. The UE 108 releases 714 the active key KeNB_s and re-establishes a layer 2 protocol stack. To re-establish a layer 2 protocol stack means, the UE 108 resets the MAC layer associated with the SeNB 106 and re-establishes the PDCP and the RLC entities associated with the SeNB 106 for each DRB established between the UE 108 and the SeNB 106. The SeNB 106 also releases 716 the old KeNB_s key. MeNB 104 then sends the SCellConfigAck 718 to the SeNB 106 and receives a SCellCommandAck 719 from the SeNB 106. Then the UE 108 performs random access 720 on one of the SCell from the plurality of added SCells, wherein the Scell on which the UE performs the random access 720 procedure is the pSCell indicated in the RRCConnectionReconfiguration message 710 from the MeNB. The SeNB 106 further uses the KeNB_s* 722, as received from the MeNB 104 as the KeNB_s. The UE 108 and the SeNB 106 start using 724 the new key derived from the updated (new) KeNB_s for the user plane traffic protection of all SCells.

If there is a requirement, trigger, or event to change the SCG security algorithm to the existing DRB between the UE 108 and the SeNB 106, then it would be reasonable to support it only by means of SCG release and addition procedure. In certain embodiments, the SeNB 106 sends a SeNB modification required message to the MeNB 104 and with SCG Change Indication having a cause value as security algorithm change (or the cause value can be as "others"). In certain embodiments, the SeNB modification required message carry the selected security algorithm. It should be noted that, based on the cause, indication, or information from the SeNB (for example, in the SeNB modification required message), the MeNB does not initiate the user plane path switch procedure with the EPC, but initiates the key change procedure with algorithm change by means of SCG release and addition procedure.

Figure 8:
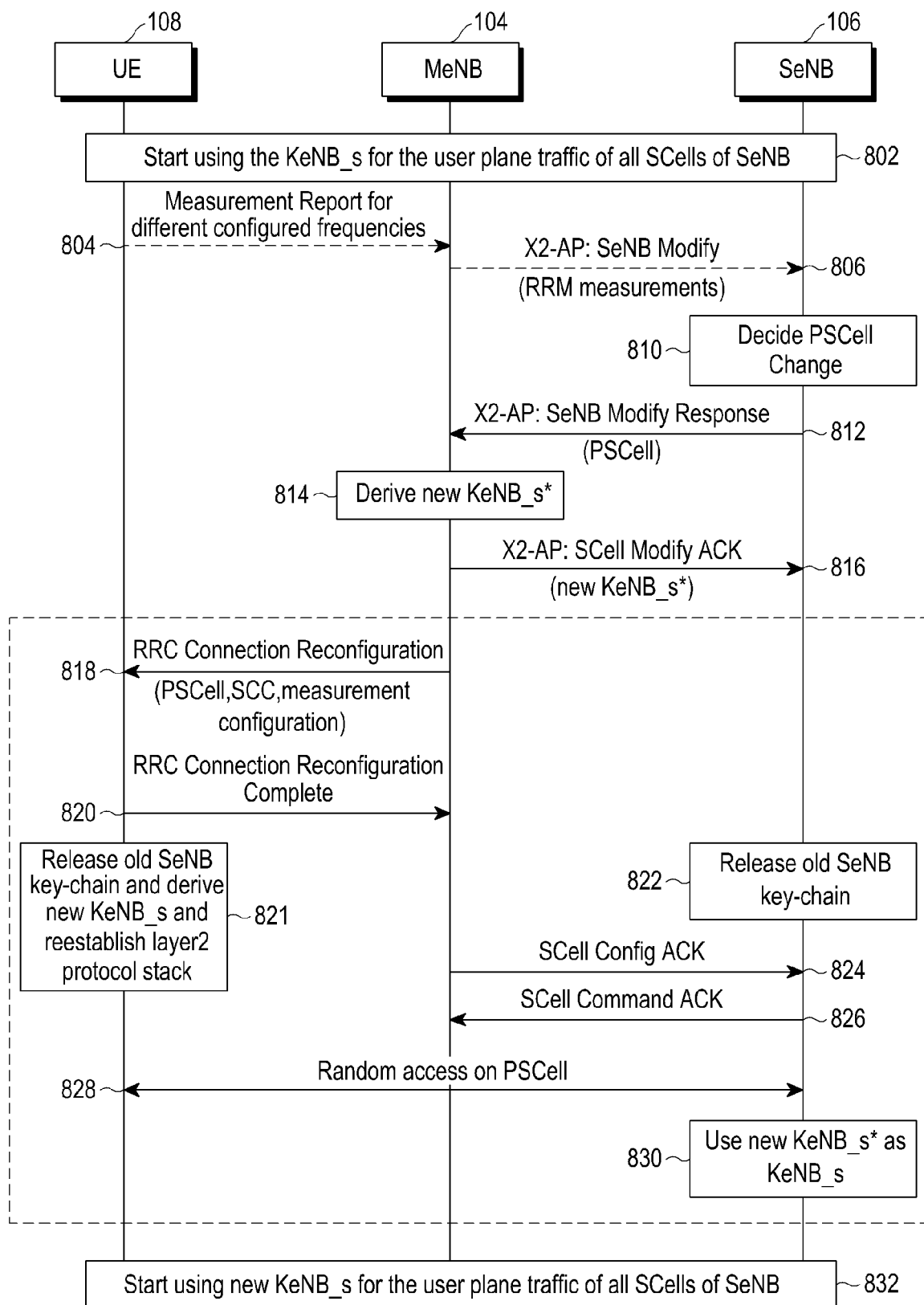
FIG. 8 illustrates an exemplary process of SeNB key refresh on the SeNB deciding to change the PSCell according to embodiments of the present disclosure.

FIG. 8 illustrates an exemplary process of SeNB key refresh on the SeNB deciding to change the PSCell, according to embodiments of the present disclosure.

The user plane protocol stack associated with the SeNB 106 is reset and reestablished 802 in the UE 108 and in the SeNB 106. The UE 108 sends measurement report 804 to the MeNB 104, for different frequencies, which have been configured on the UE 108. The MeNB 104 sends a SeNB modification request message (X2-AP) 806 to the SeNB 106, wherein the SeNB modification message 806 can include RRM measurements. Based upon the SeNB modification request message 806, the SeNB 106 decides to change the PSCell 810 and decides on an appropriate PSCell. Upon deciding to change the PSCell, the SeNB 106 sends a SeNB modification response message 812 to the MeNB 104, wherein the SeNB modification response message includes the new PSCell or cause, indication, or information, or a combination thereof, that it is for pSCell change, as determined by the SeNB 106. The MeNB 104 derives 814 a new KeNB_s* and sends a SeNB modification acknowledge message 816, including the derived KeNB_s*, to the SeNB 106. The MeNB 104 further sends the RRC-ConnectionReconfiguration message 818 to the UE 108. Upon receiving this message, the UE 108 sends the RRC-ConnectionReconfigurationComplete message 820 to the MeNB 104. The MeNB includes the necessary parameters (SCC) in the RRCConnectionReconfiguration required for the UE to update the KeNB_s. The UE 108 derives the new KeNB_s and releases 821 the old key and re-establishes a layer 2 protocol stack. The SeNB 106 also releases 822 the old key. The MeNB 104 then sends the SCellConfigAck 824 to the SeNB 106 and receives a SCellCommandAck 826 from the SeNB 106. Then the UE 108 performs random access 828 on one of the SCell from the plurality of added SCells, wherein the Scell on which the UE performs the random access 828 procedure is the pSCell indicated in the RRCConnectionReconfiguration message from the MeNB. The SeNB 106 further uses the KeNB_s* 830, as received from the MeNB 104 as the KeNB_s to derive further keys. The UE 108 and the SeNB 106 start using 832 the newly derived key from the updated KeNB_s for securing the user plane traffic of all SCells.

Figure 9:
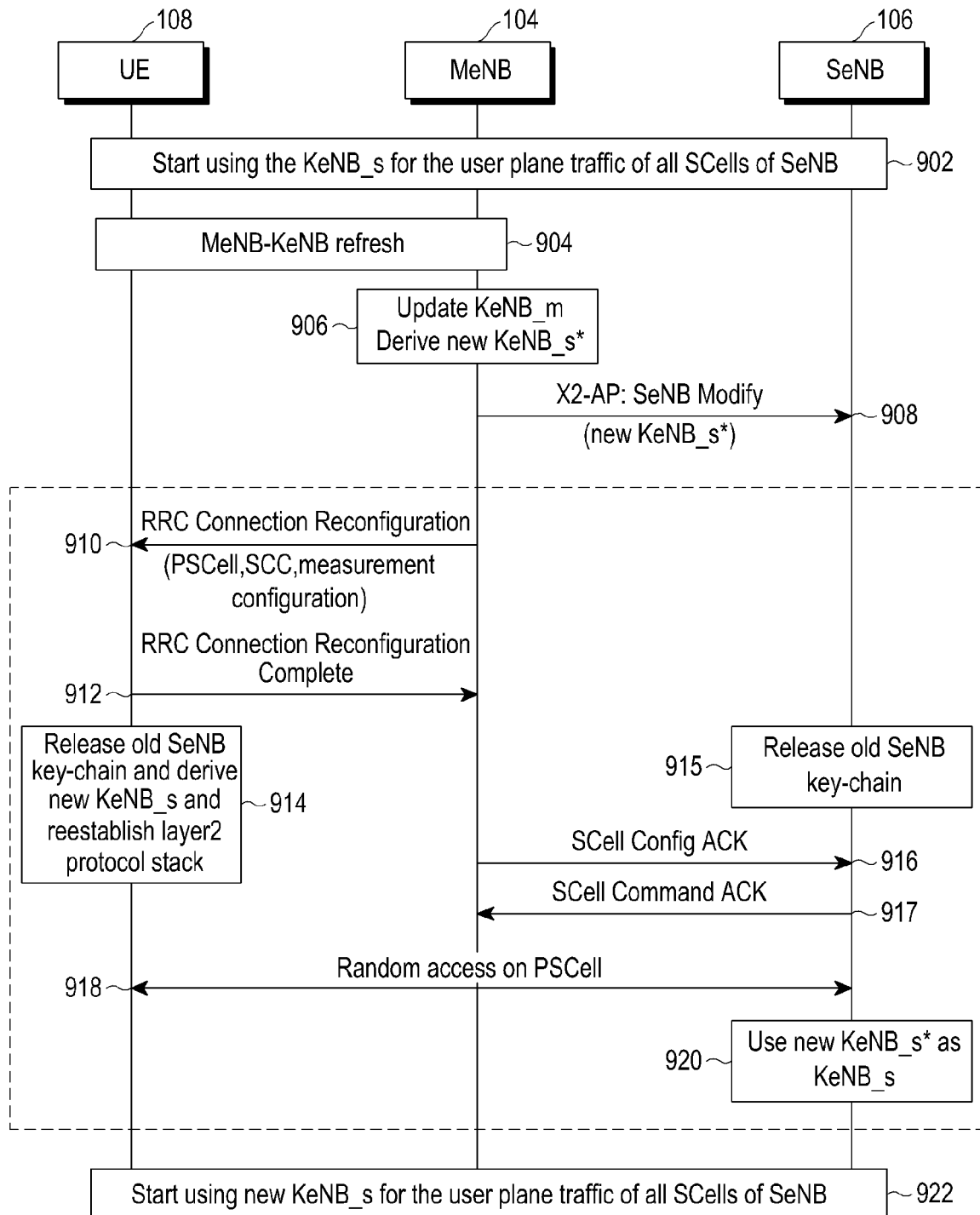
FIG. 9 illustrates an exemplary process of SCG release and addition procedure, when MeNB key is changed, according to embodiments of the present disclosure.

FIG. 9 illustrates an exemplary process of SCG release and addition procedure, when MeNB key is changed, according to embodiments of the present disclosure.

The user plane protocol stack associated with the SeNB 106 is reset and reestablished 902 in the UE 108 and in the SeNB 106. When the MeNB 104 decides to refresh 904 the KeNB, the MeNB 104 updates 906 the KeNB_m and derives the new KeNB_s*. The MeNB 104 sends a SeNB modify message 908 (comprising of the derived KeNB_s*) to the SeNB 106. The MeNB 104 further sends the RRCConnectionReconfiguration message 910 to the UE 108. The MeNB includes the necessary parameters (SCC) in the RRCConnectionReconfiguration message 910 for the UE to update the KeNB_s. Upon receiving RRCConnectionReconfiguration message 910, the UE 108 sends the RRCConnectionReconfigurationComplete message 912 to the MeNB 104. The UE 108 performs the key refresh procedure (updates the KeNB_M) and then the UE 108 derives the new KeNB_s and releases 914 the old key and re-establishes a layer 2 protocol stack. The SeNB 106 also releases 915 the old key. MeNB 104 then sends the SCellConfigAck 916 to the SeNB 106 and receives a SCellCommandAck 917 from the SeNB 106. Then the UE 108 performs random access 918 on one of the SCell from the plurality of added SCells, wherein the Scell on which the UE performs the random access 918 procedure is the pSCell indicated in the RRCConnectionReconfiguration message 910 from the MeNB. The SeNB 106 further uses the KeNB_s* 920, as received from the MeNB 104 as the KeNB_s to derive further keys. The UE 108 and the SeNB 106 start using 922 the newly derived key from the updated KeNB_s for securing the user plane traffic of all SCells.

Figure 10:
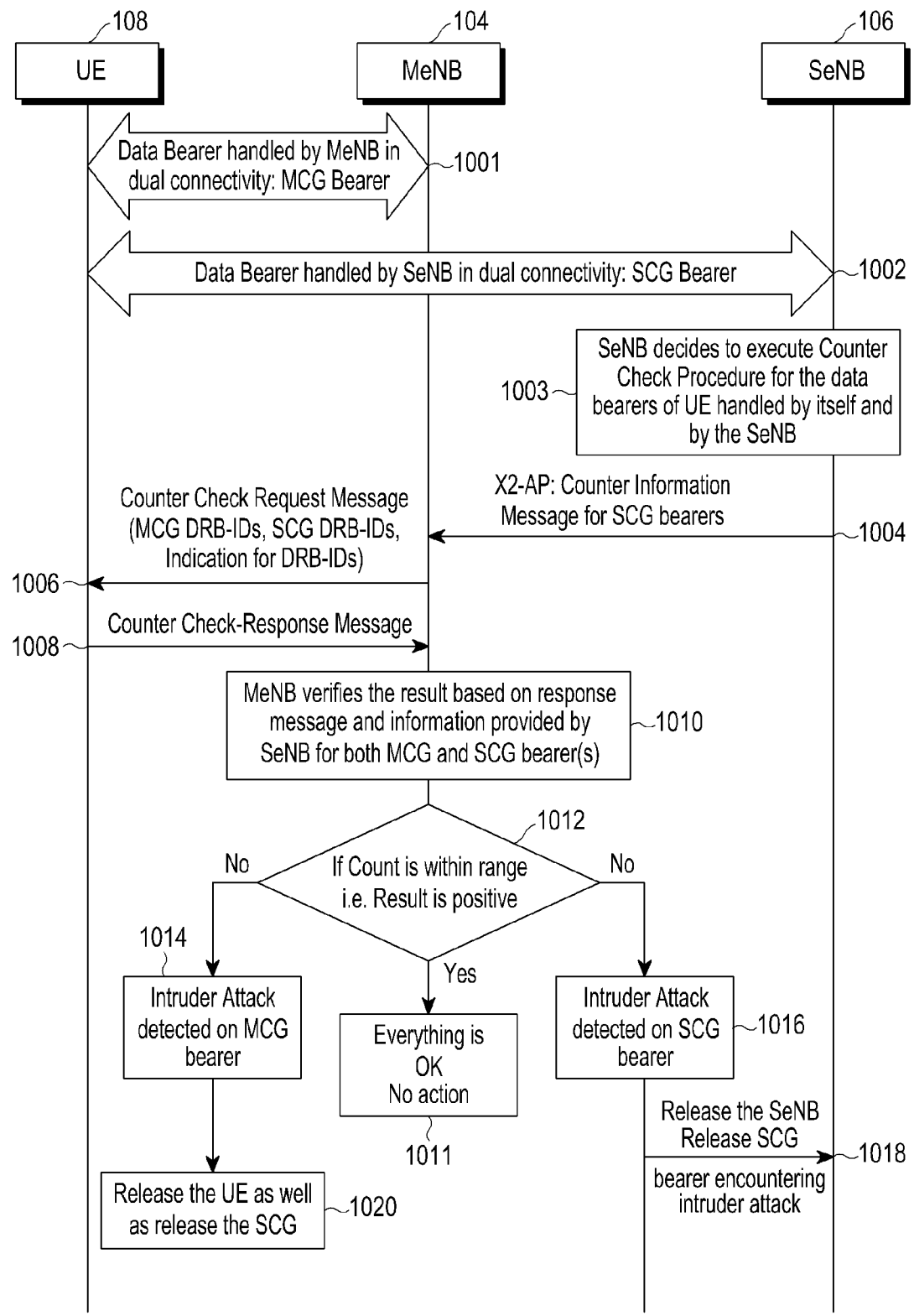
FIG. 10 illustrates process of SeNB initiating the countercheck procedure for SCG bearer and MeNB verifying the result, according to embodiments of the present disclosure.

FIG. 10 illustrates process of SeNB initiating the countercheck procedure for SCG bearer and MeNB verifying the result, according to embodiments of the present disclosure.

Data bearer 1001 handled by MeNB 104 in dual connectivity is established between UE 108 and MeNB 104. Data bearer 1002 handled by SeNB 106 in dual connectivity is established between UE 108 and SeNB 106. The SeNB 106 initiates countercheck 1003 towards the UE 108 for SCG bearers over the X2 interface. The trigger for the SeNB 106 to initiate the countercheck 1003 procedure can be periodical, wherein a periodical countercheck 1003 procedure occurs at regular time intervals. The trigger for the SeNB 106 to initiate the countercheck 1003 procedure can be event based, such as if there is sudden surge in volume of data. The trigger for the SeNB 106 to initiate the countercheck 1003 procedure can be when considered necessary (similar to other SCG bearers). The trigger for the SeNB 106 to initiate the countercheck 1003 procedure can be to check volume of data transfer. If the countercheck procedure is triggered, the SeNB 106 sends the contents (like PDCP count values and/or DRB IDs) in a counter check message 1004 to the MeNB 104 over the X2 interface. The SeNB 106 can also indicate to the MeNB 104 the current UL/DL PDCP COUNT status of the DRB and the associated DRB-ID (outside the RRC container). The SeNB 106 can also indicate an expected (PDCP sequence number) SN rate in coming seconds (again outside the RRC container) and so on. The MeNB 104 executes 1006 the RRC procedure towards the UE 108 and stores the information received from the SeNB 106 for verification. The UE 108 may verify the result based on the information received. The UE 108 compares the PDCP COUNT values received in the Countercheck message with the values of its radio bearers. The UE 108 may include different UE PDCP COUNT values for all the established DRBs (MCG DRB as well as SCG DRB) within the Countercheck Response message, if the value received and its current PDCP values are not matching (may be within acceptable window size). When the MeNB 104 receives the response 1008 from the UE 108, the MeNB 104 performs the countercheck 1010 based on the information provided by the SeNB 106. If the MeNB 104 receives a response message 1008 from the UE 108 that does not contain any PDCP COUNT values, then the MeNB 104 considers the countercheck as passed. If the countercheck is passed, then there is no intrusion detected 1011. That is, if the MeNB 104 determines 1012 that the count is not in range, an intruder attack is detected on the MCG bearer 1014 or an intruder attack is detected on the SCB bearer 1016. If the MeNB 104 receives a response that contains one or several PDCP COUNT values from the UE, then the MeNB 104 considers the countercheck as not passed (the UE can include the PDCP COUNT which are different compared to the values received from the MeNB). If the countercheck is not passed, then there is an intrusion detected. Then, the MeNB 104 alerts the SeNB 106 and takes appropriate action like initiating request for releasing the SCG 1018, releasing the UE 1020 and so forth.

Figure 11:
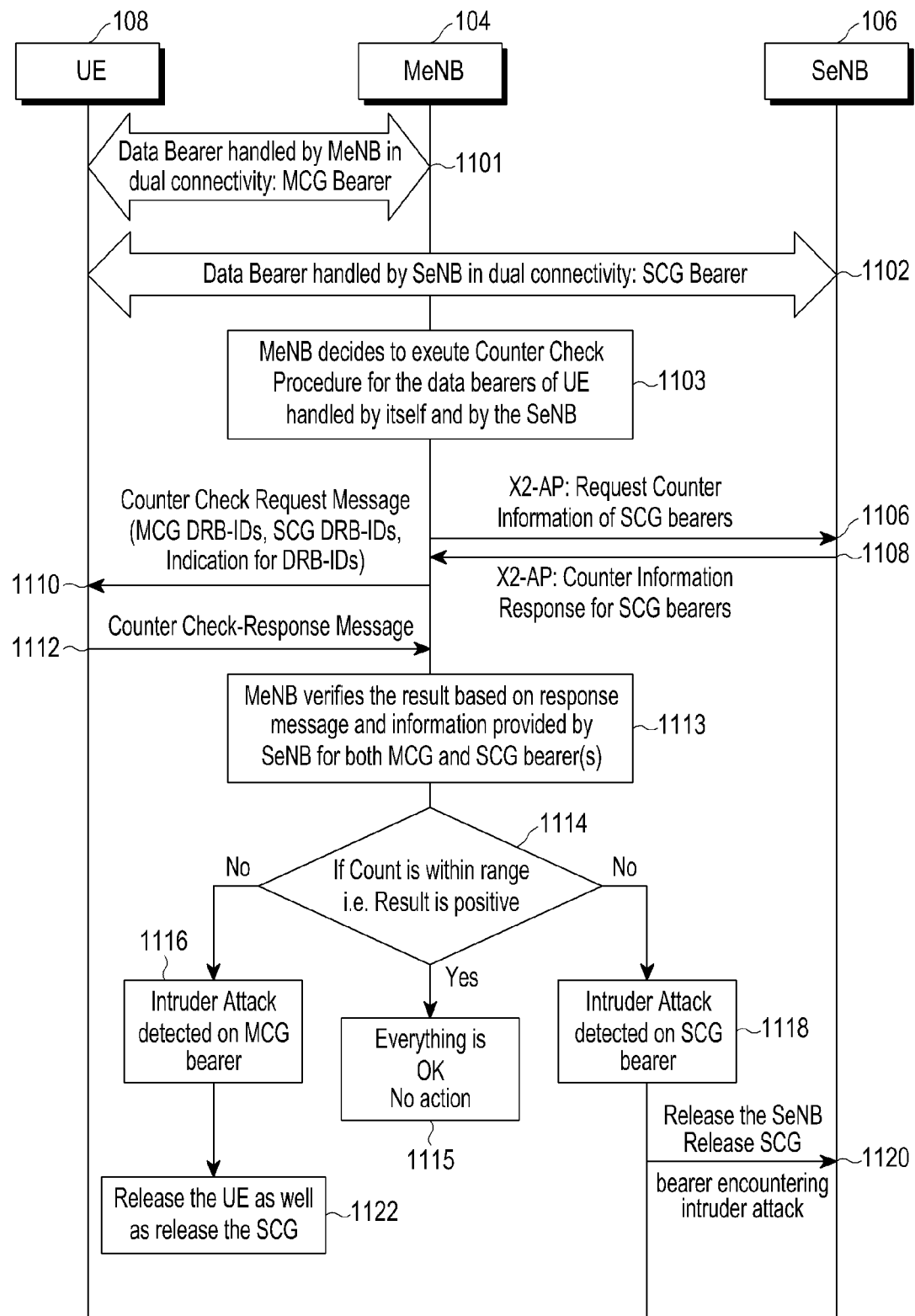
FIG. 11 illustrates process of MeNB initiating the countercheck procedure for SCG bearer and verifying the result, according to embodiments of the present disclosure.

FIG. 11 illustrates process of MeNB 104 initiating the countercheck procedure for SCG bearer and verifying the result, according to embodiments of the present disclosure.

Data bearer 1101 handled by MeNB 104 in dual connectivity is established between UE 108 and MeNB 104. Data bearer 1102 handled by SeNB 106 in dual connectivity is established between UE 108 and SeNB 106. The MeNB 104 initiates the countercheck procedure 1103 towards the UE 108 for SCG bearers. The trigger for the MeNB 104 to initiate the countercheck procedure can be periodically, wherein a periodical check procedure occurs at regular time intervals. The trigger for the MeNB 104 to initiate the countercheck procedure can be event based such as if there is sudden surge in volume of data. The trigger for the MeNB 104 to initiate the countercheck procedure can be when considered necessary similar to other MCG bearers. The trigger for the MeNB 104 to initiate the countercheck procedure can be to check volume of data transfer. If the countercheck procedure is triggered, the MeNB 104 requests 1106 the SeNB 106 for counter information for SCG bearer and the associated DRB-ID over the X2 interface of that UE 108. The SeNB 106 provides 1108 the current UL/DL sequence number (SN) status and the DRB-ID of the DRBs of that UE 108 in X2 message sent in response. Further, the MeNB 104 executes countercheck procedure 1110 towards the UE 108 and may be flagging the DRB-ID with MCG or SCG indication. The indication can be at least one of the following: a bit indication for the corresponding DRB-ID, a distinguished list of DRB-IDs of the MCG and SCG, PCI indication for the corresponding DRB-ID, PCI and EAR-FCN-DL for the corresponding DRB-ID, Global cell ID, Cell Global identifier and so on. The UE 108 compares the PDCP COUNT values received in the Countercheck message with the values of its radio bearers. The UE 108 may include different UE PDCP COUNT values for all the established DRBs (MCG DRB as well as SCG DRB) and may be flagging the DRB-ID with MCG or SCG indication within the Countercheck Response message 1112. When the MeNB 104 receives the Countercheck Response message 1112 from the UE 108, the MeNB 104 performs the countercheck 1113 based on the information provided by the SeNB 106. If the MeNB 104 receives a countercheck response message 1112 that does not contain any PDCP COUNT values, then the countercheck is passed 1115. That is, if the MeNB 104 determines 1114 that the count is not in range, an intruder attack is detected on the MCG bearer 1116 or an intruder attack is detected on the SCB bearer 1118. If the countercheck is passed, then there is no intrusion detected. If the MeNB 104 receives a countercheck response that contains one or several PDCP COUNT values, then the countercheck is not passed (the UE include the PDCP COUNT which are different compared to the values received from the MeNB). If the countercheck is not passed, then there is an intrusion detected. The MeNB 104 alerts 1120 the SeNB 106, if the mismatched PDCP COUNT of the DRB belongs to SCG and MeNB 104 takes appropriate action such as releasing the SCG, reporting to the Core Network entities to take appropriate action, releasing the UE 1122, and so forth.

Here, the MeNB 104 is in full control of handling the countercheck procedure since initiation and termination of the procedure is under MeNB 104 control. For Split bearers (RAN Split architecture as depicted in FIG. 2B) it can be assumed that the SeNB 106 applies the same DRB identity (DRB-ID) for split bearers as used by the MeNB 104 i.e. the MeNB 104 decides the identity for Split bearer. This can be applicable to SCG DRBs also where the MeNB 104 controls the entire procedure.

In certain embodiments, the UE 108 verifies and provides its counter values to the MeNB 104 over the RRC signaling for the MeNB or SeNB to verify and act.

In certain embodiments, the UE 108 verifies the count values received in countercheck request message and if the countercheck fails (the UE 108 itself detects intrusion attack), then the UE 108 sends the modified countercheck response message to the MeNB 104 that it has detected intrusion attack for SCG bearer. The MeNB 104 decides the release of the SCG and/or SCG bearer for which intrusion is detected.

In another embodiment, upon detecting intrusion attack, the UE 108 sends the modified countercheck response message to the MeNB 104 that it has detected intrusion attack for the SCG bearer and informs the MeNB 104 that the UE 108 is releasing the SCG bearer. After sending the countercheck response message, the UE 108 autonomously takes the decision to release the SCG bearer.

Figure 12:
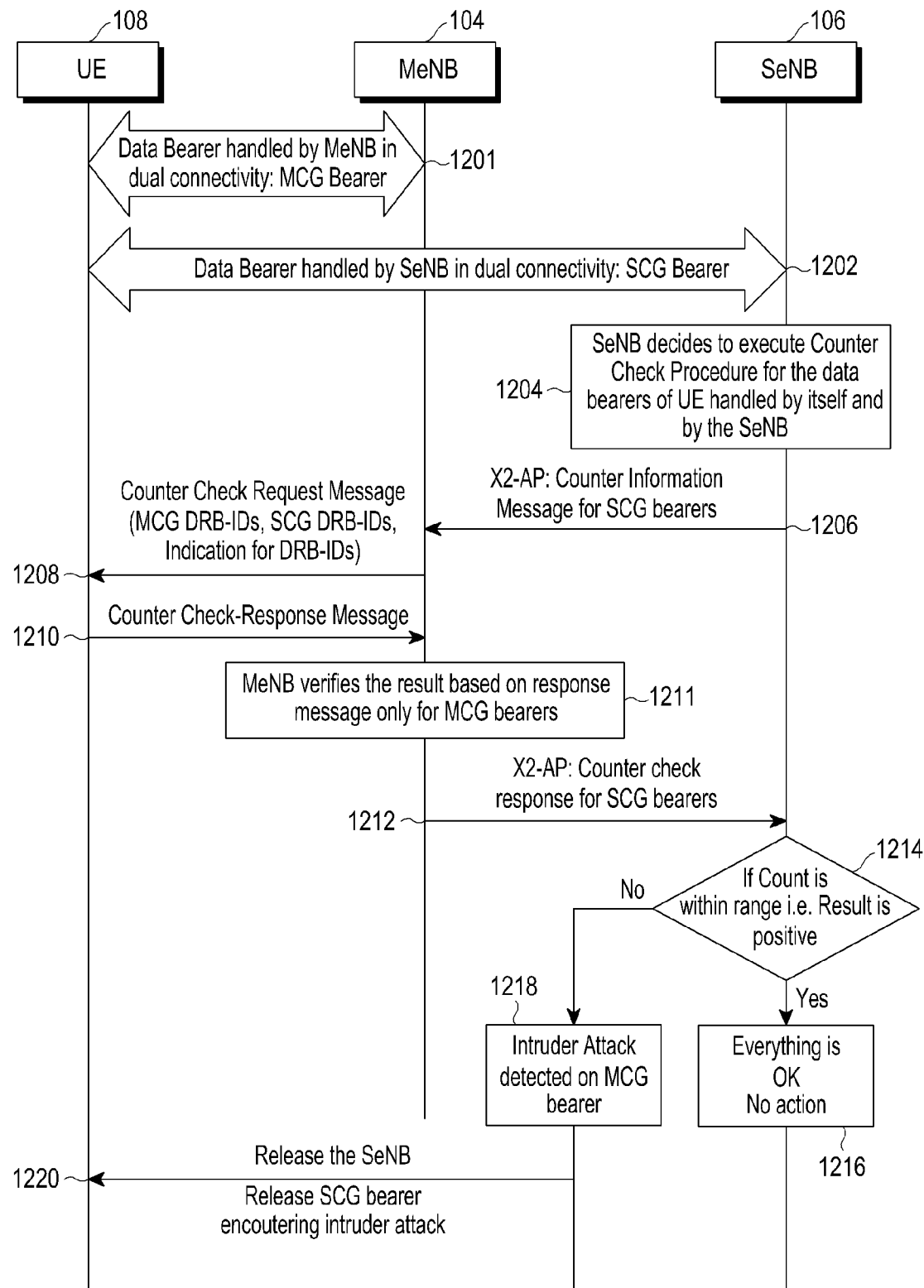
FIG. 12 illustrates process of SeNB initiating the countercheck procedure for SCG bearer and verifying the result, according to embodiments of the present disclosure.

FIG. 12 illustrates process of SeNB initiating the countercheck procedure for SCG bearer and verifying the result, according to embodiments of the present disclosure.

Data bearer 1201 handled by MeNB 104 in dual connectivity is established between UE 108 and MeNB 104. Data bearer 1202 handled by SeNB 106 in dual connectivity is established between UE 108 and SeNB 106. The SeNB 106 initiates the countercheck 1204 towards the UE 108 for SCG bearers over the X2 interface. The trigger for the SeNB 106 to initiate the countercheck procedure can be at periodical, wherein a periodical check procedure occurs at regular time intervals. The trigger for the SeNB 106 to initiate the countercheck procedure can be event based such as if there is sudden surge in volume of data. The trigger for the SeNB 106 to initiate the countercheck procedure can be when considered necessary similar to other SCG bearers. The trigger for the SeNB 106 to initiate the countercheck procedure can be to check volume of data transfer. If the countercheck procedure is triggered, the SeNB 106 sends the contents (PDCP Count) in a countercheck message 1206 to the MeNB 104 over the X2 interface. The MeNB 104 transparently executes 1208 an RRC procedure to the UE 108 by forwarding the countercheck message received from the SeNB 106 to the UE 108. The UE 108 verifies the result based on the information received. The UE 108 compares the PDCP COUNT values received in the Countercheck message with the values of its radio bearers. The UE 108 may include different UE PDCP COUNT values for all the established DRBs (MCG DRB as well as SCG DRB) within the Countercheck Response message 1210. MeNB verifies 1211 a result based on the Countercheck Response message 1210 for the MCG bearers. When the MeNB 104 receives the Countercheck Response message 1210 from the UE, the MeNB 104 forwards 1212 the response message on X2 interface to the SeNB 106 in a transparent manner. The SeNB 106 verifies 1214 the result based on the information forwarded by the MeNB 104. If the SeNB 106 receives a countercheck response message that does not contain any PDCP COUNT values, then the SeNB 106 considers the countercheck as passed. If the countercheck is passed, then there is no intrusion detected 1216. If the SeNB 106 receives a countercheck response that contains one or several PDCP COUNT values, then the SeNB 106 considers the countercheck as not passed (the UE include the PDCP COUNT which are different compared to the values received from the MeNB). If the countercheck is not passed, then there is an intrusion detected 1218. Then, if the mismatched PDCP COUNT of the DRB belongs to SCG, the SeNB 106 takes appropriate action like initiating request for releasing the SCG 1220, report to the Core Network entities via the MeNB to take appropriate action and so on.

The countercheck procedures can be used interchangeably, two or more countercheck procedures can be merged, or a combination of merging and interchanging of procedures can be used as required.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method performed by a master base station in a wireless communication system supporting a dual connectivity of a user equipment (UE), the method comprising:
   receiving, from a secondary base station, a request message including information associated with a packet data convergence protocol (PDCP) count; and
   performing a check procedure for the PDCP count to verify a value of the PDCP count, based on the information associated with the PDCP count,
   wherein the value of the PDCP count is associated with a secondary cell group (SCG) bearer established in the secondary base station.

2. The method of claim 1, wherein the SCG bearer is offloaded from the master base station to the secondary base station.

3. The method of claim 1, wherein the information associated with the PDCP count comprises identification information of the SCG bearer and the value of the PDCP count in at least one of an uplink or a downlink.

4. The method of claim 1, wherein the check procedure for the PDCP count is performed periodically.

5. The method of claim 1, further comprising detecting an attack for the SCG bearer based on whether the check procedure for the PDCP count is passed.

6. The method of claim 1, further comprising releasing a connection for the SCG based on the check procedure for the PDCP count being not passed.

7. The method of claim 1, wherein performing the check procedure for the PDCP count comprises receiving a counter check response message from the UE,
   wherein values of PDCP counts included in the counter check response message are associated with the master base station and the secondary base station.

8. A master base station in a wireless communication system supporting a dual connectivity of a user equipment (UE), the master base station comprising:
   a transceiver; and
   a processor configured to:
   receive, from a secondary base station via the transceiver, a request message including information associated with a packet data convergence protocol (PDCP) count; and
   perform a check procedure for the PDCP count to verify a value of the PDCP count, based on the information associated with the PDCP count, wherein the value of the PDCP count is associated with a secondary cell group (SCG) bearer established in the secondary base station.

9. The master base station of claim 8, wherein the SCG bearer is offloaded from the master base station to the secondary base station.

10. The master base station of claim 8, wherein the information associated with the PDCP count comprises identification information of the SCG bearer and the value of the PDCP count in at least one of an uplink or a downlink.

11. The master base station of claim 8, wherein the check procedure for the PDCP count is performed periodically.

12. The master base station of claim 8, wherein the processor is further configured to detect an attack for the SCG bearer based on whether the check procedure for the PDCP count is passed.

13. The master base station of claim 8, wherein the processor is further configured to release a connection for the SCG based on the check procedure for the PDCP count being not passed.

14. The master base station of claim 8, wherein the processor is further configured to receive, via the transceiver, a counter check response message from the UE,
   wherein values of PDCP counts included in the counter check response message are associated with the master base station and the secondary base station.

15. A non-transitory storage medium having stored therein instructions which cause, when executed by at least one processor of a master base station, the at least one processor to perform at least one operation which comprises:
   receiving, from a secondary base station, a request message including information associated with a packet data convergence protocol (PDCP) count; and
   performing a a check procedure for the PDCP count to verify a value of the PDCP count, based on the information associated with the PDCP count,
   wherein the value of the PDCP count is associated with a secondary cell group (SCG) bearer established in the secondary base station.

16. The non-transitory storage medium of claim 15, wherein the SCG bearer is offloaded from the master base station to the secondary base station.

17. The non-transitory storage medium of claim 15, wherein the information associated with the PDCP count comprises identification information of the SCG bearer and the value of the PDCP count in at least one of an uplink or a downlink.

18. The non-transitory storage medium of claim 15, wherein the check procedure for the PDCP count is performed periodically.

19. The non-transitory storage medium of claim 15, wherein the at least one operation further comprises releasing a connection for the SCG based on the check procedure for the PDCP count being not passed.

20. The non-transitory storage medium of claim 15, wherein performing the check procedure for the PDCP count comprises receiving a counter check response message from a user equipment (UE),
   wherein values of PDCP counts included in the counter check response message are associated with the master base station and the secondary base station.

* * * * *